US011626982B1

(12) United States Patent
Griffin et al.

(10) Patent No.: US 11,626,982 B1
(45) Date of Patent: Apr. 11, 2023

(54) SYSTEMS AND METHODS FOR MAINTAINING CONFIDENTIALITY, INTEGRITY, AND AUTHENTICITY OF THE LAST SECRET

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

(*) Notice: Subject to any disclaimer, the term of this patent is extended or adjusted under 35 U.S.C. 154(b) by 189 days.

(21) Appl. No.: 16/203,191

(22) Filed: Nov. 28, 2018

(51) Int. Cl.
*H04L 9/08* (2006.01)
*H04L 9/40* (2022.01)
*H04L 9/32* (2006.01)
*H04L 9/00* (2022.01)

(52) U.S. Cl.
CPC ............ *H04L 9/085* (2013.01); *H04L 9/0825* (2013.01); *H04L 9/0861* (2013.01); *H04L 9/0894* (2013.01); *H04L 9/3247* (2013.01); *H04L 63/10* (2013.01); *H04L 63/123* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 9,455,968 B1 * | 9/2016 | Machani | ............ H04L 63/0428 |
| 9,722,779 B1 | 8/2017 | Tomomura | |
| 9,768,953 B2 | 9/2017 | Bernat et al. | |
| 10,148,433 B1 * | 12/2018 | Lozin | ...................... G06F 21/30 |
| 10,270,770 B1 * | 4/2019 | Irwan | ................... H04L 9/3239 |
| 2002/0071566 A1 | 6/2002 | Kurn | |

(Continued)

FOREIGN PATENT DOCUMENTS

WO   WO-00/49768 A1   8/2000

OTHER PUBLICATIONS

Zhou, B., et al., Jun. 2018. An authentication scheme using identity-based encryption & blockchain. In 2018 IEEE Symposium on computers and communications (ISCC) (pp. 00556-00561). IEEE. (Year: 2018).*

(Continued)

*Primary Examiner* — Luu T Pham
*Assistant Examiner* — Edward X Long
(74) *Attorney, Agent, or Firm* — Foley & Lardner LLP

(57) ABSTRACT

Systems and methods for securely sharing and authenticating a last secret. A method includes generating a first key and a last secret. The method includes splitting the last secret into first second splits; signing the splits using a dealer signing key to attach a dealer signature to each of the splits; encrypting the first split using a first key of a first share-holder and encrypting the second split using a first key of a second share-holder; decrypting the first split using the first key of the first share-holder and encrypting the first split using a second key of the first share-holder; decrypting the second split using the first key of the second share-holder and encrypting the second split using a second key of the second share-holder. Encrypting maintains confidentiality of the last secret. The dealer signature can be verified to determine integrity and authenticity of the last secret.

12 Claims, 12 Drawing Sheets

(56) References Cited

U.S. PATENT DOCUMENTS

| | | | |
|---|---|---|---|
| 2013/0013931 A1* | 1/2013 | O'Hare | H04L 9/3231 |
| | | | 713/189 |
| 2015/0229480 A1* | 8/2015 | Joye | H04L 9/3255 |
| | | | 713/176 |
| 2019/0035018 A1* | 1/2019 | Nolan | H04L 9/3236 |
| 2019/0342083 A1* | 11/2019 | LeSaint | G06F 21/6209 |
| 2019/0342084 A1* | 11/2019 | Mehedy | H04L 9/0643 |
| 2020/0159563 A1* | 5/2020 | Luo | G06F 9/45558 |
| 2020/0250327 A1 | 8/2020 | Naraidoo et al. | |

OTHER PUBLICATIONS

Sun, Y. et al., Jul. 2018. A decentralizing attribute-based signature for healthcare blockchain. In 2018 27th International conference on computer communication and networks (ICCCN) (pp. 1-9). IEEE. (Year: 2018).*

Chang et al., "A New Multi-stage Secret Sharing Scheme Using One-way Function", ACM SIGOPS Operating Systems Review 39(1):48-55; Jan. 2005.

Harn & Wang, "Threshold Signature Scheme without Using Polynomial Interpolation," International Journal of Network Security 18(4), pp. 710-717 (2016).

Harn, et al., "How to Share Secret Efficiently over Networks," Security and Communication Networks 2017, 5437403, 6 pages (2017).

Nilsson et al., Key Management and Secure Software Updates in Wireless Process Control Environments, 2008, WiSec'08, pp. 100-108. (Year: 2008).

Saied et al., HIP Tiny Exchange (TEX): A Distributed Key Exchange Scheme for HIP-based Internet of Things, 2012 (Year: 2012).

* cited by examiner

SYSTEMS AND METHODS FOR MAINTAINING CONFIDENTIALITY, INTEGRITY, AND AUTHENTICITY OF THE LAST SECRET

TECHNICAL FIELD

The present application relates generally to systems and methods for securely storing passwords and/or encryption keys.

BACKGROUND

Access to electronic entities such as servers, databases, applications, etc. can be controlled using a cryptographic process. The cryptographic process can be initiated using a cryptographic key. The cryptographic key may be password-protected to prevent initialization of the cryptographic process without authorization. The password is considered a "last secret," because it is the final element needed to recover the cryptographic key. However, the cryptographic key and the password must be saved to a non-volatile medium such that the cryptographic key and the password can survive an application or system restart. The password can be encrypted using a second cryptographic key to prevent retrieval and use of the password by an unauthorized party. The second cryptographic key then becomes the last secret needed to decrypt the password used to unlock the first cryptographic key. The password or the second cryptographic key can be fragmented into components, shares, or obfuscated in some other manner. The components, shares, etc. of the password or the second cryptographic key can be stored securely on a non-volatile medium. Often, the components, shares, etc. of the second cryptographic key are stored on media such as paper, smart cards, or USB sticks that are provided to human operators. The human operators must then provide the components, shares, etc. to regenerate the second cryptographic key. The human operators may need to provide their component, share, etc. to regenerate the second cryptographic key simultaneously, which can be inconvenient. Furthermore, if the paper, smart cards, or USB sticks are stolen by an unauthorized party, the unauthorized party can regenerate the second cryptographic key.

SUMMARY

One embodiment relates to a method for securely sharing and authenticating a last secret. The method includes generating, by a dealer computing system, a first key and a last secret. The first key provides access to a secure computing system. The last secret is the last cryptographic element controlling access to the first key. The method includes splitting, by the dealer computing system, the last secret into a first split and a second split. The method includes cryptographically signing the first split and the second split using a dealer signing key of the dealer computing system so as to attach a dealer signature to each of the first split and the second split. The method includes encrypting, by the dealer computing system, the first split using a first key of a first share-holder and encrypting, by the dealer computing system, the second split using a first key of a second share-holder. The first share-holder is structured to store the dealer signed and encrypted first split. The second share-holder is structured to store the dealer signed and encrypted second split. The method includes decrypting, by the first share-holder, the first split using the first key of the first share-holder and encrypting, by the share-holder, the first split using a second key of the share-holder that has been established with a combining computing system. The method includes decrypting, by the second share-holder, the second split using the first key of the second share-holder and encrypting, by the share-holder computing system, the second split using a second key of the share-holder that has been established with the combining computing system. The encrypting maintains confidentiality of the last secret, and the dealer signature can be verified to determine integrity and authenticity of the last secret.

In some embodiments, the method further includes receiving, by the combining computing system, the dealer signed and encrypted first split from the first share-holder and the dealer signed and encrypted second split from the second share-holder. The method further includes decrypting, by the combining computing system, the dealer signed and encrypted first split with the second key of the first share-holder and the dealer signed and encrypted second split with the second key of the second share-holder to determine the first split and the second split. The method further includes authenticating, by the combining computing system, the first split and the second split by verifying the dealer signature of the first split and the dealer signature of the second split using the dealer signing key of the dealer computing system. The method further includes combining, by the combining computing system, the first split and the second split to determine the last secret.

One embodiment relates to a system for securely sharing and authenticating a last secret. The system includes a dealer computing system, a first share-holder, and a second share-holder. The dealer computing system includes a dealer signing key, an encryption key established with a first share-holder, and an encryption key established with a second share-holder. The dealer computing system includes an encryption circuit and a splitting circuit. The encryption circuit is structured to generate a first key and a last secret. The first key provides access to a secure computing system. The last secret is the last cryptographic element controlling access to the first key. The splitting circuit is structured to split the last secret into a first split and a second split so as to maintain integrity of the last secret. The splitting circuit is structured to cryptographically sign each of the first split and the second split with the dealer signing key so as to generate a dealer signature for the first split and the second split. The respective dealer signatures are verifiable so as to maintain integrity and authenticity of the last secret. The splitting circuit is structured to generate a dealer signed and encrypted first split and a dealer signed and encrypted second split by encrypting the dealer signed first split with the encryption key established with the first share-holder structured to store the dealer signed and encrypted first split and by encrypting the dealer signed second split with the encryption key established with the second share-holder structured to store the dealer signed and encrypted second split so as to maintain confidentiality of the last secret. The first share-holder includes a first key established with the dealer computing system and a second key established with a combining computing system. The first share-holder includes an encryption circuit structured to decrypt the first split using the first key and encrypt the first split using the second key. The second share-holder includes a first key established with the dealer computing system and a second key established with the combining computing system. The second share-holder includes an encryption circuit structured to decrypt the second split using the first key and encrypt the second split using the second key.

In some embodiments, the system includes the combining computing system including a combining circuit, the dealer signing key, an encryption key established with the first share-holder, and an encryption key established with the second share-holder. The combining circuit is structured to receive the dealer signed and encrypted first split from the first share-holder and the dealer signed and encrypted second split from the second share-holder. The combining circuit is structured to decrypt the dealer signed and encrypted first split with the encryption key established with the first share-holder. The combining circuit is structured to decrypt the dealer signed and encrypted second split with the encryption key established the second share-holder. The combining circuit is structured to authenticate the first split and the second split by verifying the dealer signature of the first split and the dealer signature of the second split using the dealer signing key so as to verify the authenticity of the first split and the second split. The combining circuit is structured to combine the first split and the second split to determine the last secret.

One embodiment is related to a method for securely sharing and authenticating a last secret. The method includes generating, by a dealer computing system, a first key and a last secret. The first key provides access to a secure computing system. The last secret is the last cryptographic element controlling access to the first key. The method includes splitting, by the dealer computing system, the last secret into a first split and a second split. The method includes cryptographically signing, by the dealer computing system, the first split and the second split using a dealer signing key of the dealer computing system so as to generate a dealer signature for each of the first split and the second split. The method includes encrypting, by the dealer computing system, the dealer signed first split and the dealer signed second split with an encryption key established with a combining computing system so as to generate a dealer signed and encrypted first split and a dealer signed and encrypted second split. The method includes generating, by the dealer computing system, a first block including the dealer signed and encrypted first split. The method includes adding the first block to a last secret block chain. The method includes generating, by the dealer computing system, a second block including the dealer signed and encrypted second split. The method includes adding the second block to the last secret block chain. The encryption maintains confidentiality of the last secret, and the dealer signature can be verified to determine integrity and authenticity of the last secret.

In some embodiments, the method further includes retrieving, by the combining computing system, the dealer signed and encrypted first split and the dealer signed and encrypted second split from the blockchain. The method includes decrypting, by the combining computing system, the dealer signed and encrypted first split and the dealer signed and encrypted second split with an encryption key established with the dealer computing system to determine the first dealer signed split and the second dealer signed split. The method further includes authenticating, by the combining computing system, each of the first split and the second split by verifying the dealer signature of the first split and the dealer signature of the second split using the dealer signing key so as to verify the authenticity of the first split and the second split. The method further includes combining, by the combining computing system, the first split and the second split to determine the last secret. The encryption maintains confidentiality of the last secret, and the dealer signature can be verified to determine integrity and authenticity of the last secret.

DETAILED DESCRIPTION

Figure 1:
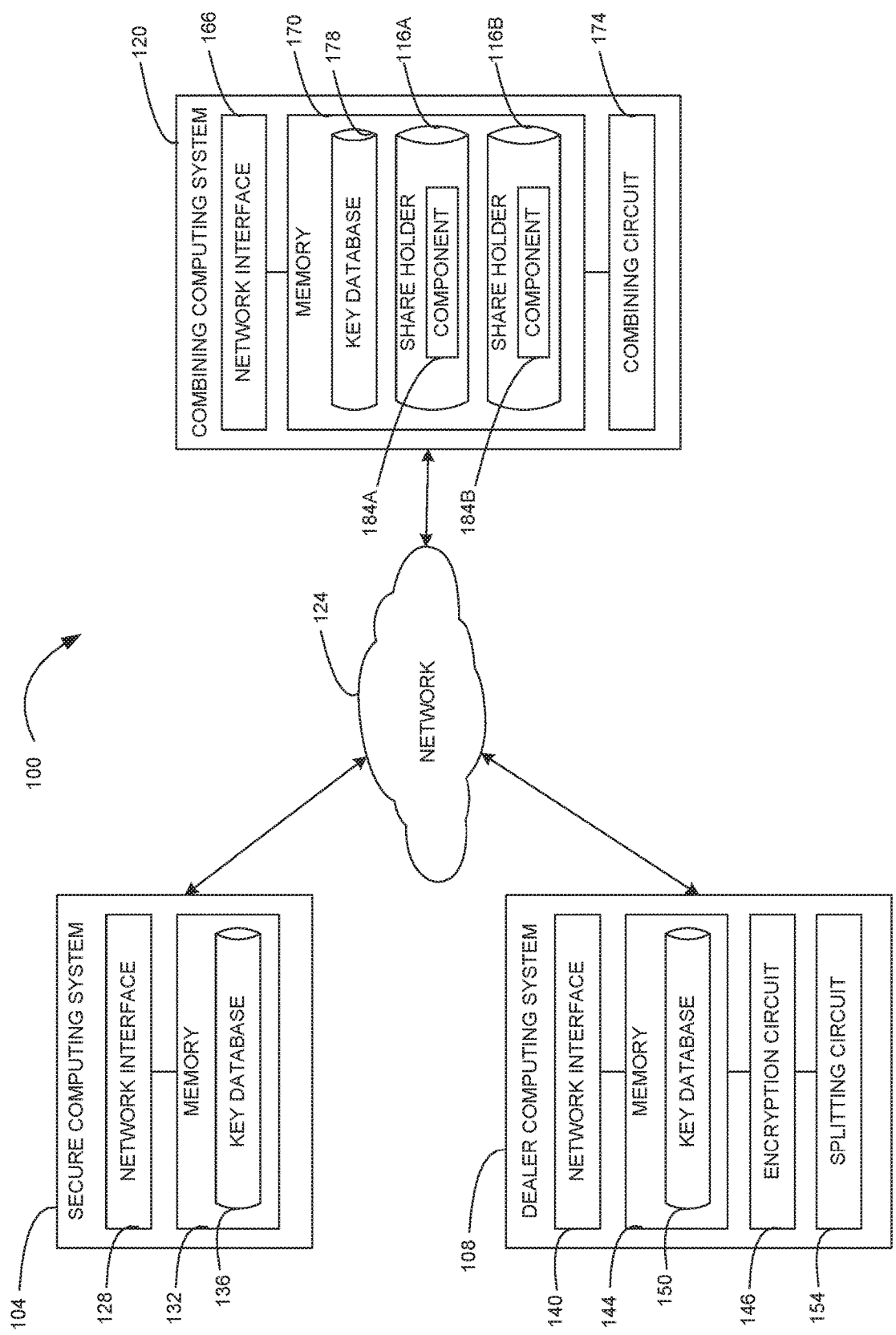
FIG. 1 is an environmental view of a system for generating a last secret and maintaining confidentiality, integrity, and authenticity of the last secret, according to one embodiment.

Referring to the figures generally, various systems, methods, and apparatuses for maintaining the integrity, authenticity, and confidentiality of a last secret are described herein. The last secret as used herein refers to the last cryptographic element that controls access to an encryption key, a biometric, one or more pieces of encrypted data, a password used to generate a key, a password used to access data and/or a secure computing device, or any other information intended to be stored securely. An example embodiment is described as follows. A system for securely sharing and authenticating a last secret can include a secure computing system, a dealer computing system, share-holders, and a combining computing system. In some embodiments, the secure computing system, the dealer computing system, the share holders, and the combining computing system can all be separate entities. In some embodiments, at least two of the secure computing system, the dealer computing system, and the combining computing system can be embodied in the same entity.

The dealer computing system includes a dealer signing key and a share-holder encryption key from each share-holder. As used herein, the term "dealer signing key" refers to an encryption key or keys used to generate a dealer signature. In some embodiments, the dealer signing key can be a private key of an asymmetric key pair of the dealer computing system. In some embodiments, the dealer signing key can be a symmetric key. As used herein, the term "dealer signature" refers to a digital signature, a trusted time stamp, a hash signature, a time stamp token, a MAC, and/or an HMAC. The dealer signature can be used to authenticate each of the splits. In embodiments in which the dealer signing key is a private key of the dealer computing system, the dealer signature is based on the private (e.g., never shared) key of the dealer computing system. In embodiments in which the dealer signature is a MAC or HMAC key, the dealer signing key is a symmetric key that is unique to the dealing computing system and a specific recipient. In some embodiments, the specific recipient can be the combining computing system. The "share-holder encryption keys" referred to herein can be content encryption keys (CEKs). The CEKs can be stablished using either cryptographic message syntax (CMS)-based key transport or key agreement schemes. Encryption using CMS or key agreement schemes ensure that the encrypted splits can only be decrypted by a particular computing system.

The dealer computing system includes an encryption circuit and a splitting circuit. The encryption circuit is structured to generate a first key and a last secret. The first key provides access to a secure computing system. The last secret is the last cryptographic element controlling access to the first key. The splitting circuit is structured to split the last secret into a plurality of splits. In some embodiments, the splitting circuit is structured to split the last secret into components according to an N of N component scheme or to split the last secret into shares according to a N of M share scheme. The splitting circuit is structured to sign each of the splits with a dealer signature generated using the dealer signing key so as to maintain authenticity of the splits. The splitting circuit is structured to generate encrypted splits by, for each of the splits, encrypting the splits with the share-holder encryption key of the share-holder structured to store the at least one encrypted split so as to maintain confidentiality of the last secret. Each of the splits is encrypted for the designated share-holder recipient using the encryption key of that share-holder.

The combining computing system includes a combining circuit, the dealer signing key, and a share-holder encryption key of each of the share-holders. The combining circuit is structured to receive each of the at least one encrypted splits from each of the share-holders. The encrypted splits maintain confidentiality of the last secret because only the intended target computing system can decrypt the encrypted splits. The combining computing system is structured to decrypt each of the at least one encrypted splits with the share-holder encryption key of each of the share-holders; authenticate each of the splits by verifying the dealer signature using the dealer signing key so as to verify the authenticity of the last secret; and combine each of splits to determine the last secret so as to verify the integrity of the last secret.

Referring now to FIG. 1, an environmental view of a system 100 for generating a last secret that can be stored confidentially and that can be authenticated is shown, according to an example embodiment. The last secret refers to the last cryptographic element that controls access to an encryption key, a biometric, one or more pieces of data, a tokenized value, or any other information intended to be stored securely. The last secret can be a password, an encryption key, or a detokenization request that must be provided by an entity to gain access to initialization information to start up a cryptographic process for communicating with a secure computing system 104 or to access the biometric, the one or more pieces of encrypted data, etc. As shown in FIG. 1, the system 100 includes the secure computing system 104, a dealer computing system 108, share-holders 116, and a combining computing system 120 connected by a network 124. While the secure computing system 104, the dealer computing system 108, the and the combining computing system 120 are shown as separate entities in FIG. 1, in some embodiments, one or more of the secure computing system 104, the dealer computing system 108, the share-holders 116, and the combining computing system 120 can be parts of the same computing system. While the share-holders 116 are illustrated as being part of the combining computing system 120, in some embodiments, the share-holders 116 can be separate entities.

In the illustrated embodiment, the share-holders 116 include a first share-holder 116A and a second share-holder 116B of the combining computing system 120. Each of the plurality of share-holders 116 is writable by a separate administrator and/or process and can have a separate share-holder encryption key. In other embodiments, share-holders 116 can be in other locations that are in communication with the network 124. In some embodiments, the share-holders 116 can be on physical media such as USB memory sticks, smart cards, etc. In the illustrated embodiment, the plurality of share-holders 116 includes the first share-holder 116A and the second share-holder 116B. In some embodiments, the share-holders 116 can be structured to authenticate a dealer signature of the dealer signed and encrypted splits 184 using the dealer signing key of the dealer computing system 108. In some embodiments, the share-holders 116 can be structured to decrypt the dealer signed and encrypted splits 184 using a share-holder encryption key that has been established with the dealer computing system 108. The share-holders 116 can then be structured to encrypt the splits 184 with a share-holder encryption key that has been established with the combining computing system 120 to generate dealer signed and encrypted splits 184 that can be decrypted by the combining computing system 120.

The secure computing system 104 can be a database server, an application server, a file server, a mail server, a print server, a web server, and/or a game server that is in communication with other computing systems and/or client devices connected to the network 124. In other embodiments, the secure computing system 104 can be a computing system that includes encrypted data. The secure computing system 104 includes a network interface 128 and a memory 132. In some embodiments, the secure computing system 104 can include the dealer computing system 108. In other embodiments, the secure computing system 104 and the dealer computing system 108 can be separate entities. The network interface 128 of the secure computing system 104 is adapted for and structured to establish a communication session via the network 124 with the other components of the system 100. As used herein, a "network interface" may include any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), and a combination thereof (e.g., both a cellular transceiver and a Bluetooth transceiver). As shown in FIG. 1, the memory 132 is communicably and operatively coupled with the other components of the secure computing system 104. The memory 132 includes a key database 136. The key database 136 is structured to retrievably store information related to the public/private key pair of the secure computing system 104. As shown in FIG. 1, the memory 132 is communicably and operatively coupled with the other components of the secure computing system 104.

The dealer computing system 108 includes a network interface 140, a memory 144, an encryption circuit 146, and a splitting circuit 154. The network interface 140 is structured to establish a communication session via the network 124 with the other components of the system 100. As shown in FIG. 1, the memory 144 is communicably and operatively coupled with the other components of the dealer computing system 108. The memory 144 includes a key database 150 including a first key for accessing the secure computing system 104, a password, and an optional second key that have been generated by the encryption circuit 146. The password is structured to control access to the first key. In embodiments that do not include the second key, the password is the last secret. In some embodiments, the password can be encrypted using the second key. In such embodiments, the second key is the last secret. In embodiments in which the second key is the last secret, the encrypted password is stored to the memory 132 of the secure computing system 104.

The splitting circuit 154 is structured to establish share-holder encryption keys for each of the share-holders. In the illustrated embodiment, the dealer computing system 108 is structured to establish a share-holder encryption key for the first share-holder 116A and a share-holder encryption key for the second share-holder 116B. The share-holder encryption key of the first share-holder 116A and the share-holder encryption key of the second share-holder 116B can be content encryption keys (CEKs). The CEKs can be established using either cryptographic message syntax (CMS)-based key transport or key agreement schemes. The memory 144 includes a key database 150 structured to retrievably store information related to the dealer signing key and the share-holder encryption keys that have been established between the dealer computing system 108 and each of the share-holders 116. In embodiments in which the dealer computing system 108 is separate from the secure computing system 104, the key database 150 may include an encryption key for communicating with the secure computing system 104. The encryption key can be a CEK that is established with the secure computing system 104 using CMS-based key transport or key agreement schemes.

The splitting circuit 154 is structured to receive the last secret from the dealer computing system 108 and read the last secret into a volatile memory. The splitting circuit 154 is structured to split the last secret into a plurality of splits 184. As illustrated in FIG. 1, the splitting circuit 154 is structured to split the last secret into components of a N of N scheme such that the splits 184 are the components 184 of the N of N scheme. In the illustrated embodiment, the splitting circuit 154 is structured to split the last secret into a first component 184A and a second component 184B. In other embodiments, the splitting circuit 154 may split the last secret into a different number of components. The splitting circuit 154 is structured to generate a random number and save the random number as the first component 184A. The splitting circuit 154 is structured to combine the random number with the last secret using exclusive or (XOR) to generate the second component 184B. The splitting circuit 154 is then structured to erase the last secret from the volatile memory and not write the last secret to the memory 144. Splitting the last secret into the components 184A, 184B maintains the integrity of the last secret because components that have been altered or replaced by a malicious party cannot be recombined into the last secret.

The splitting circuit 154 is structured to sign the first component 184A and the second component 184B with a dealer signature using the dealer signing key of the dealer computing system 108. In embodiments in which the dealer signature is a digital signature, the dealer signing key can be a private key of the dealer computing system 108. In other embodiments, the splitting circuit 154 is structured to encrypt or signcrypt the components 184A, 184B using at least the private key of dealer computing system 108. The dealer signature of the components 184A, 184B can be used by the combining computing system 120 to authenticate the components 184A, 184B.

The splitting circuit 154 is structured to encrypt the first component 184A with the share-holder encryption key of the first share-holder 116A of the combining computing system 120 and then send the dealer signed and encrypted first component 184A to the first share-holder 116A of the combining computing system 120. The splitting circuit 154 is structured to encrypt the second component 184B with the share-holder encryption key of the second share-holder 116B of the combining computing system 120 and then send the dealer signed and encrypted second component 184B to the second share-holder 116B of the combining computing system 120. Encrypting the first component 184A and the second component 184B with the share-holder encryption keys of the share-holders 116A, 116B maintains the confidentiality of each of the components 184A, 184B, which in turn maintains the confidentiality of the last secret. The splitting circuit 154 does not encrypt the dealer signature. In embodiments in which multiple last secrets need to be protected, the last secrets can be individually encrypted using a password encryption key (WEK) that is split into components 184 according to a N of N scheme as described above for the last secret.

In some embodiments, the first component 184A and the second component 184B can be structured to be valid for a predetermined time period. In some embodiments, the predetermined time period may be a week, a month, or a year. In some embodiments, the dealer signature can include information indicative of the predetermined time period. Near the end of the predetermined time period, the dealer computing system 108 can be structured to request the last secret from the secure computing system 104. The splitting circuit 154 is structured to split the last secret into a second plurality of components 184.

The combining computing system 120 is a computing system or can be a part of a computing system that desires to access the secure computing system 104. For example, in embodiments in which the secure computing system 104 is an application server or a database, the combining computing system 120 may run an application or a program that needs to access the secure computing system 104. The combining computing system 120 includes a network interface 166, a memory 170, and a combining circuit 174. The memory 170 can include a key management database 178 and the plurality of share-holders 116.

The combining computing system 120 is structured to retrieve the dealer signed and encrypted first component 184A from the first share-holder 116A and the dealer signed and encrypted second component 184B from the second share-holder 116B after the combining computing system 120 has started up. The combining circuit 174 is then structured to decrypt the dealer signed and encrypted first component 184A using the share-holder encryption key of the first share-holder 116A. The combining circuit 174 is then structured to decrypt the dealer signed and encrypted second component 184B using the share-holder encryption key of the second share-holder 116B. The combining circuit 174 is structured to verify the dealer signature of each of the first component 184A and the second component 184B using the dealer signing key of the dealer computing system 108 to verify integrity and authenticity of the first component 184A and the second component 184B. After authenticating the first component 184A and the second component 184B, the combining circuit 174 is structured to combine the first component 184A and the second component 184B to regenerate the last secret. For example, the combining circuit 174 can XOR the first component 184A and the second component 184B together to regenerate the last secret. The combining computing system 120 can then use the last secret to access the first key of the secure computing system 104. The combining computing system 120 is structured to store the last secret within volatile memory and erase the last secret after the first key has been retrieved. The combining computing system 120 is structured to never write the last secret to the memory 170, cache memory, or any other non-volatile media. The combining computing system 120 can then communicate with the secured computing system 104 using the first key.

Figure 2A:
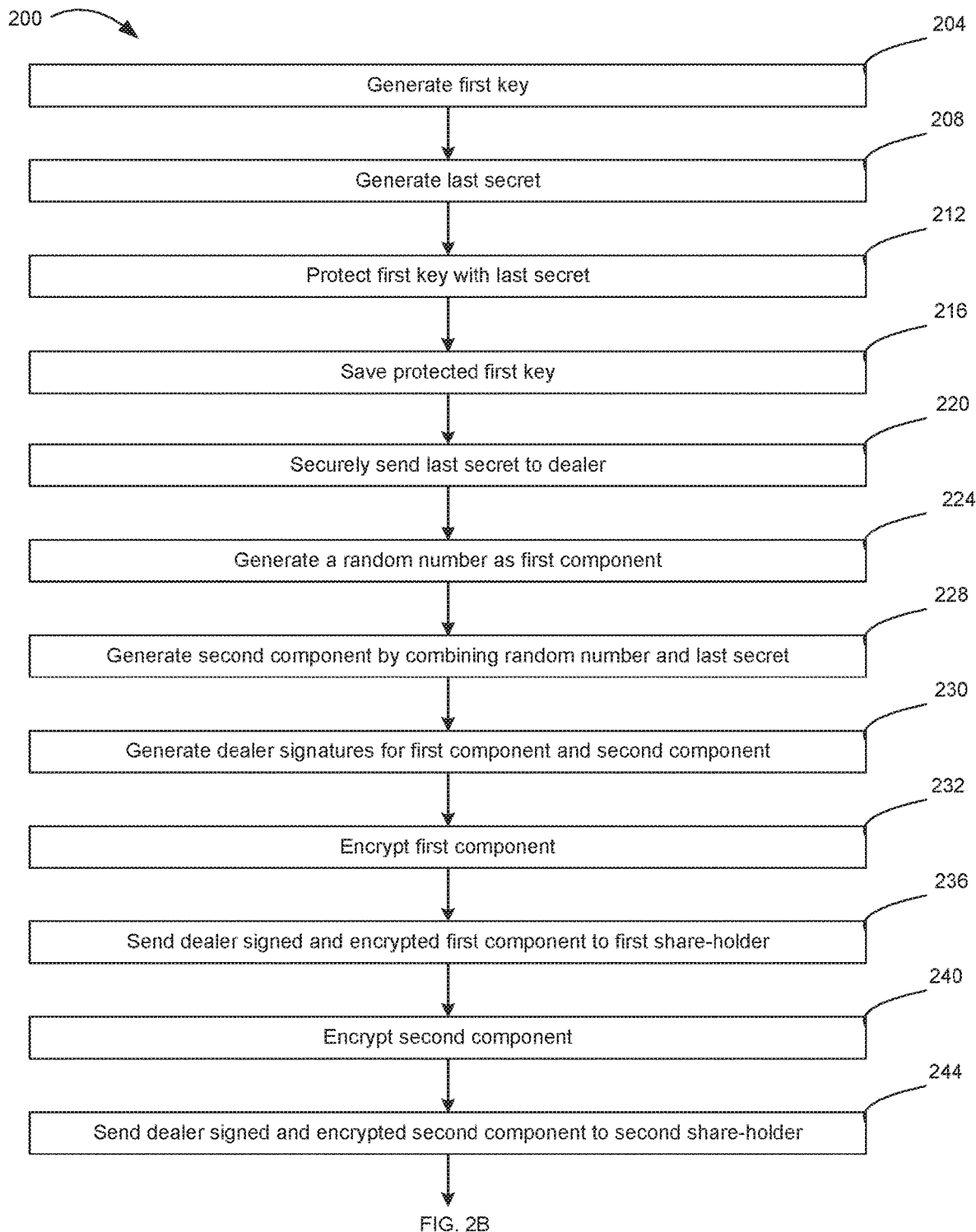
FIGS. 2A and 2B are flow diagrams showing a process of generating and sharing the last secret while maintaining confidentiality, integrity, and authenticity of the last secret, according to one embodiment.
Figure 2B:
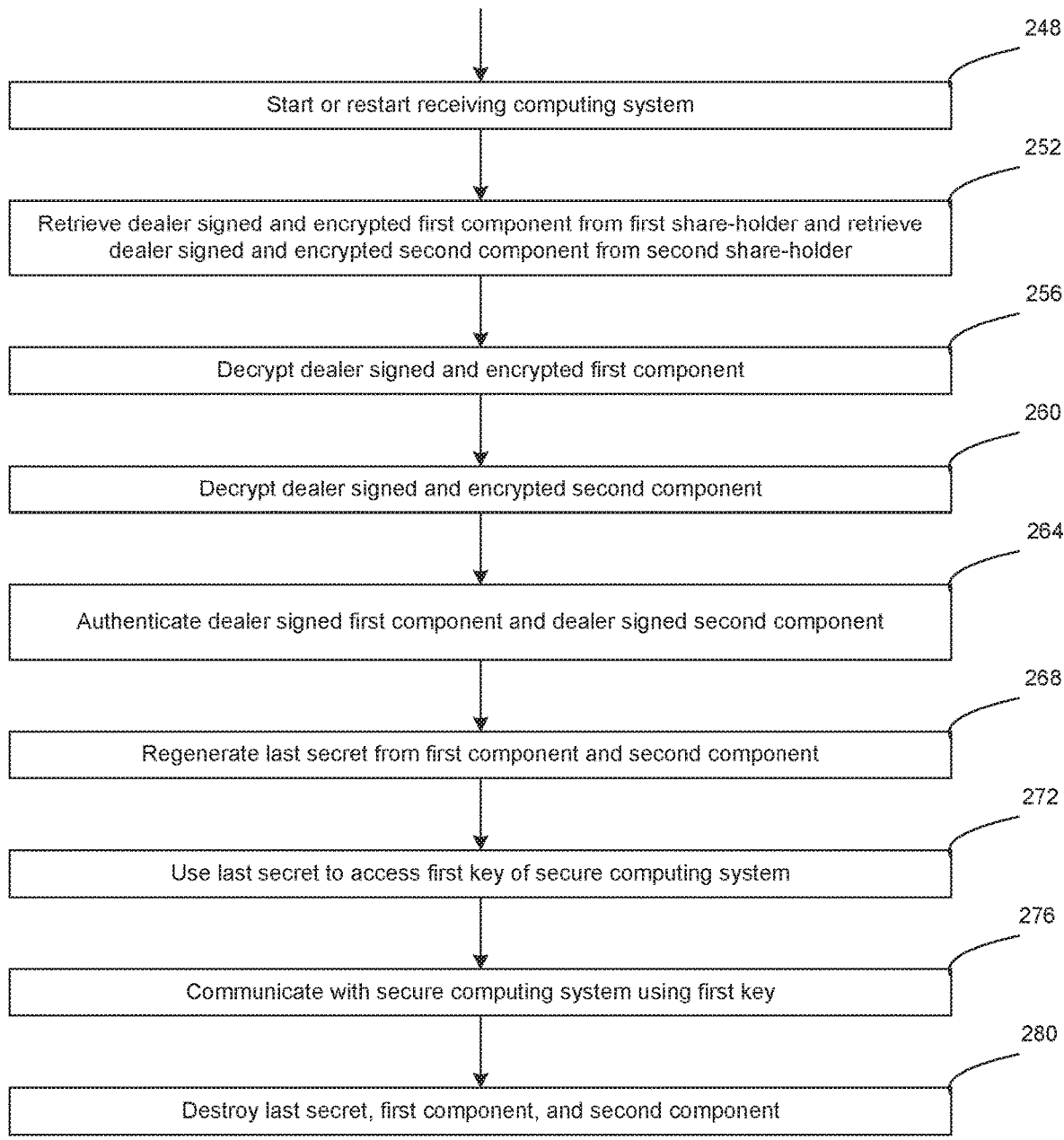

Referring now to FIG. 2, a flow diagram of a method 200 for maintaining the confidentially, authenticity, and integrity of a last secret is shown, according to an example embodiment. At step 204, the first key for the secure computing system 104 is generated by the encryption circuit 146 of the dealer computing system 108. At step 208, the last secret is generated by the encryption circuit 146. At step 212, the first key is protected with the last secret. At step 216, the protected first key is saved to the memory 132 of the secure computing system 104. At step 220, the last secret is sent to the dealer computing system 108. At step 224, the splitting circuit 154 generates a random number as the first component 184A. At step 228, the splitting circuit 154 uses XOR to generate a second component 184B from the last secret and the first component 184A. Splitting the last secret into the components 184A, 184B maintains the integrity of the last secret because components that have been altered or replaced by a malicious party cannot be recombined into the last secret. At step 230, the splitting circuit 154 signs a portion of each of the first component 184A and the second component 184B with a dealer signature using the dealer signing key. In embodiments in which the dealer signature is a digital signature, the splitting circuit 154, the dealer signing key is the private key of the dealer computing system 108. In other embodiments, the splitting circuit 154 encrypts or signcrypt the components 184A, 184B using at least the private key of dealer computing system 108. Signing the components 184A, 184B with the dealer signature can be used by the combining computing system 120 to authenticate the components 184A, 184B. At step 232, the splitting circuit 154 encrypts the first component 184A using the share-holder encryption key of the first share-holder 116A. At step 236, the splitting circuit 154 sends the dealer signed and encrypted first component 184A to the first share-holder 116A. At step 240, the splitting circuit 154 encrypts second component 184B using the share-holder encryption key of the second share-holder 116B. At step 244, the splitting circuit 154 sends the dealer signed and encrypted second component 184B to the share-holder 116B. In some embodiments, the components 184A, 184B may be encrypted before they are dealer signed. In such embodiments, the steps 232 and 240 occur before the step 230. Encrypting the first component 184A and the second component 184B with the share-holder encryption keys of 176A, 176B, respectively, of the recipients (e.g., the shareholder 116A, 116B, respectively) maintains the confidentiality of each of the components 184A, 184B, which in turn maintains the confidentiality of the last secret.

In some embodiments, the first share-holder 116A may verify the authenticity of the dealer signed and encrypted first split 184A using the dealer signing key of the dealer computing system 108. In some embodiments, the first share-holder 116A may decrypt the dealer signed and encrypted first split 184A using the share-holder encryption key established with dealer computing system 108. The first share-holder 116A may then encrypt the first split 184A using a share-holder encryption key established with the combining computing system 120 to generate a dealer signed and encrypted first split 184A that can be decrypted by the combining computing system 120.

In some embodiments, the second share-holder 116B may verify the authenticity of the dealer signed and encrypted second split 184B using the dealer signing key of the dealer computing system 108. In some embodiments, the second share-holder 116B may decrypt the dealer signed and encrypted second split 184B using the share-holder encryption key established with the dealer computing system 108. The second share-holder 116B may then encrypt the second split 184A using the share-holder encryption key established with the combining computing system 120 to generate a dealer signed and encrypted second split 184B that can be decrypted by the combining computing system 120.

At step 248, the combining computing system 120 starts or restarts and desires to establish a connection with the secure computing system 104. At step 252, the combining circuit 174 retrieves the dealer signed and encrypted first component 184A from the first share-holder 116A and the dealer signed and encrypted second component 184B from the second share-holder 116B. At step 256, the combining circuit 174 decrypts the dealer signed and encrypted first component 184A using the share-holder encryption key of the first share-holder 116A. At step 260, the combining circuit 174 decrypts the dealer signed and encrypted second component 184B using the share-holder encryption key of the second share-holder 116B. At step 264, the combining circuit 174 authenticates the dealer signed first component 184A and the dealer signed second component 184B using the dealer signing key of the dealer computing system 108 to verify the authenticity of the dealer signatures. In some embodiments, the 264 may occur before the steps 256 and 260. At step 268, after authenticating the first component 184A and the second component 184B, the combining circuit 174 regenerates the last secret from the first component 184A and the second component 184B using XOR. Successful regeneration of the last secret verifies the integrity of the first component 184A and the second component 184B. At step 272, the combining circuit 174 uses the last secret to access the first key of the secure computing system 104. At step 276, the combining computing system 120 communicates with the secure computing system 104 using the first key. At step 280, the last secret, the first component, and the second component are erased, and are never written to disk memory, cache memory, or any other non-volatile media.

Figure 3:
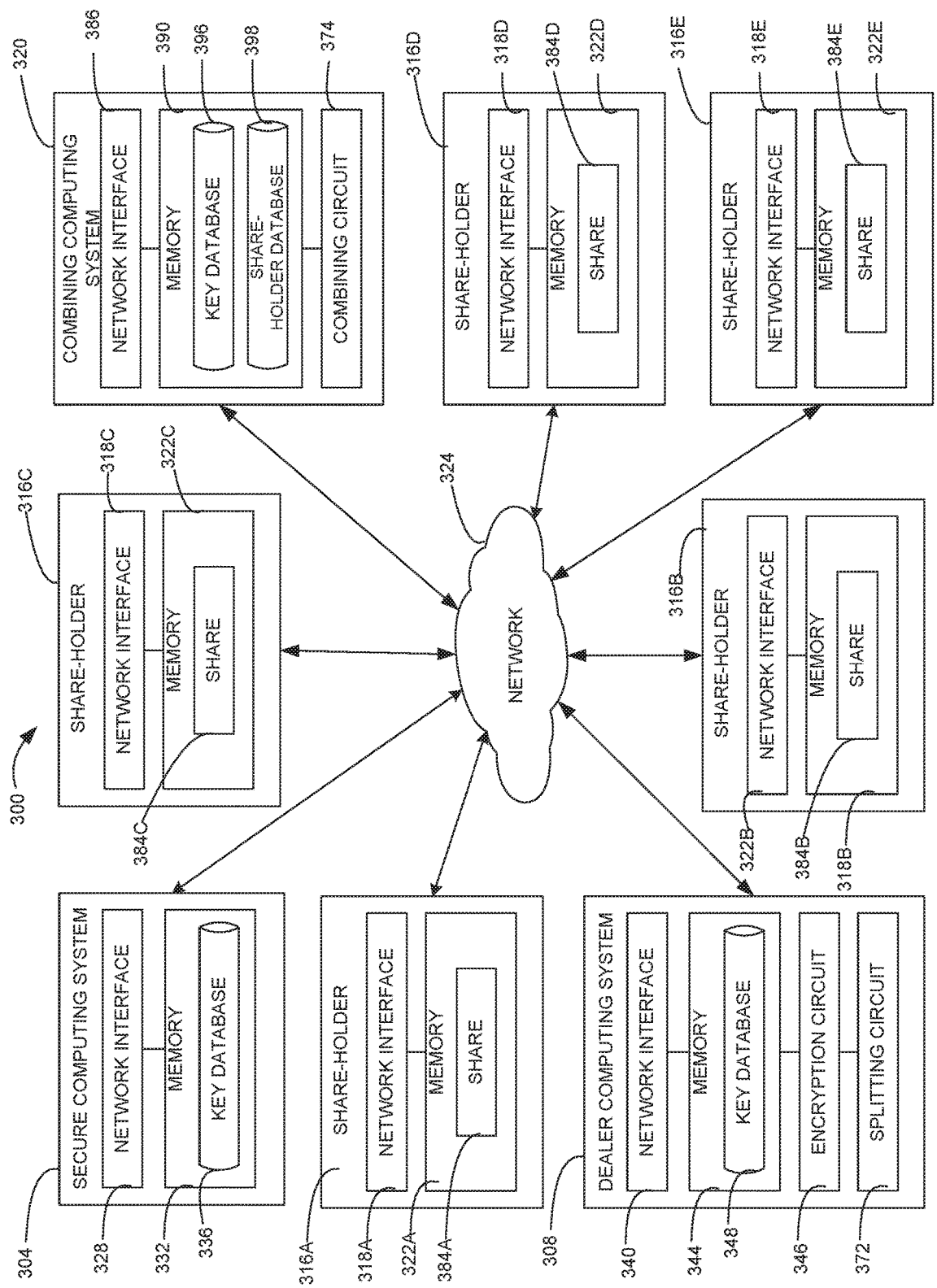
FIG. 3 is an environmental view of a system for generating a last secret and maintaining confidentiality, integrity, and authenticity of the last secret, according to one embodiment.

Referring now to FIG. 3, an environmental view of a system 300 for generating a last secret that can be stored confidentially and that can be authenticated is shown, according to an example embodiment. The last secret can be a password, an encryption key, or a tokenized value that must be provided by an entity to gain access to initialization information to start up a cryptographic process for communicating with a secure computing system 304. As shown in FIG. 3, the system 300 includes the secure computing system 304, a dealer computing system 308, share-holders 316, and a combining computing system 320 connected by a network 324. While the secure computing system 304, the dealer computing system 308, the share-holders 316, and the combining computing system 320 are shown as separate entities in FIG. 3, in some embodiments, one or more of the secure computing system 304, the dealer computing system 308, and the combining computing system 320 can be parts of the same system.

In the illustrated embodiment, the share-holders 316 include five share-holders 316A-316E. The share-holders 316 are stored on different computing systems that are connected to the network 324. The share-holders 316 can be writable by separate administrators and/or processes, readable by an application and/or system process, and include unique share-holder encryption keys. In the illustrated embodiment, the share-holders include a network interface 318 and a memory 322. In some embodiments, one or more of the share-holders 316 can be on physical media such as USB memory sticks, smart cards, etc. In some embodiments, the share-holders 316 can be structured to authenticate a dealer signature of the dealer signed and encrypted splits 384 using the dealer signing key of the dealer computing system 108. In some embodiments, the share-holders 316 each can be structured to decrypt the dealer signed and encrypted split 384 stored in each of the share-holders 316 using the dealer signing key of the dealer computing system 308. Each of the share-holders 316 can then be structured to encrypt the split 384 stored in each of the share-holders 316 with the share-holder encryption key established with the combining computing system 320 to generate dealer signed and encrypted splits 384 that can be decrypted by the combining computing system 320.

The secure computing system 304 can be a database server, an application server, a file server, a mail server, a print server, a web server, and/or a game server that is in communication with other serving computing systems and/or client devices connected to the network 324. In other embodiments, the secure computing system 304 can be a computing system that includes encrypted data. The secure computing system 304 includes a network interface 328 and a memory 332. In some embodiments, the secure computing system 304 can include the dealer computing system 308. In other embodiments, the secure computing system 304 and the dealer computing system 308 can be separate entities. The network interface 328 of the secure computing system 304 is adapted for and structured to establish a communication session via the network 324 with the other components of the system 300. As shown in FIG. 3, the memory 332 is communicably and operatively coupled with the other components of the secure computing system 304. The memory includes a key database 336. The key database 336 is structured to retrievably store information related to the secure computing system's 304 encryption key. As shown in FIG. 3, the memory 332 is communicably and operatively coupled with the other components of the secure computing system 304.

The dealer computing system 308 includes a network interface 340, a memory 344, an encryption circuit 346, and a splitting circuit 372. The network interface 340 is structured to establish a communication session via the network 324 with the other components of the system 300. As shown in FIG. 3, the memory 344 is communicably and operatively coupled with the other components of the dealer computing system 308. The memory includes a key database 348 including a first key for accessing the secure computing system 304, a password, and an optional second key that have been generated by the encryption circuit 346. The password is structured to control access to the first key. In embodiments that do not include the second key, the password is the last secret. In some embodiments, the password can be encrypted using the second key. In such embodiments, the second key is the last secret. In embodiments in which the second key is the last secret, the encrypted password is stored to the memory 332 of the secure computing system 304.

The dealer computing system 308 is structured to establish share-holder encryption keys for each of the share-holders 316. In the illustrated embodiment, the dealer computing system 308 is structured to establish a share-holder encryption key for the first share-holder 316A, and a share-holder encryption key for the second share-holder 316B, a share-holder encryption key for the third share-holder 316C, a share-holder encryption key for the fourth share-holder 316D, and a share-holder encryption key for the fifth share-holder 316E. The share-holder encryption keys of the share-holders 316A-316E can be CEKs. The CEKs can be established using either CMS-based key transport or key agreement schemes. The memory 344 includes a key management database 396 structured to retrievably store information related to the dealer computing system's 308 dealer signing key and the share-holder encryption keys for each of the share-holders 316.

The splitting circuit 372 is structured to receive the last secret from the dealer computing system 308 and read the last secret into a volatile memory. The splitting circuit 372 is structured to split the last secret into a plurality of splits 384. More specifically, the splitting circuit 372 is structured to split the last secret into shares of a N of M scheme such that the splits 384 are the shares 384 of the N of M scheme. The splitting circuit 372 is structured to split the last secret into M number of shares 384. The last secret can be regenerated from a portion (e.g., N) of the M shares 384. For example, the shares 384 can be inputs to a polynomial over a finite field such as a Galois Field to regenerate the last secret. The splitting circuit 372 is then structured to erase the last secret from the volatile memory and not write the last secret to the memory 344. Splitting the last secret into the shares 384 maintains the integrity of the last secret because shares that have been altered or replaced by a malicious party cannot be recombined into the last secret. In the illustrated embodiment, the splitting circuit 372 is structured to divide the last secret according to a 3 of 5 scheme, meaning that the splitting circuit 372 divides the last secret into 5 shares 384A-384E, any three of which can be recombined to regenerate the last secret. In other embodiments, the splitting circuit 372 can divide the last secret into a different number N shares, any number M of which can be recombined to regenerate the last secret.

The splitting circuit 372 is structured to sign each of the shares 384 with the private key of the dealer computing system 308 to create a dealer signature. In other embodiments, the splitting circuit 154 is structured to encrypt or signcrypt the shares 384 using at least the private key of dealer computing system 108. The dealer signatures of the shares 384 can be used by the combining computing system 320 to authenticate the shares 384. In other embodiments, the shares 384 can be authenticated by decrypting the encryption or signcryption using the dealer signing key of the dealer computing system 108.

The splitting circuit 372 is structured to store each of the dealer signed N shares 384 in a different share-holder 316. For example, the splitting circuit 372 is structured to store each of the dealer signed shares 384A-384E in a different share-holder 316A-318E, respectively. The share-holders 316 are located on different computing systems connected to the network 324. In some embodiments, one of the share-holders 316 can be on the combining computing system 320. Accordingly, the splitting circuit 372 is structured to encrypt each of the N shares 384 using a share-holder encryption key of one of the share-holders 316. For example, the splitting circuit 372 is structured to encrypt each of the shares 384A-384E using a share-holder encryption key of one of the share-holders 316A-316E, respectively. The share-holder encryption keys of the share-holders 316 can be CEKs. The CEKs can be stablished using either CMS-based key transport or key agreement schemes. The splitting circuit 372 is structured to send the N dealer signed and encrypted shares 384 to the respective N share-holders. For example, the splitting circuit 372 is structured to send each of the dealer signed and encrypted shares 384A-384E to the respective N share-holders 316A-316E. In other embodiments, the splitting circuit 372 can be structured to encrypt each of the splits 384 with one or more share-holder encryption keys established with the combining computing system 320. Encrypting the dealer signed and encrypted shares 384 with the share-holder encryption keys of the share-holders 316 maintains the confidentiality of each of the dealer signed and encrypted shares 384, which in turn maintains the confidentiality of the last secret. The splitting circuit 372 does not encrypt the dealer signatures of the shares 384. In embodiments in which multiple last secrets need to be protected, the last secrets can be individually encrypted using a password encryption key (WEK) that is split into shares 384 according to a N of M scheme as described above for the last secret.

In some embodiments, each of the share-holders 316 may verify the authenticity of the dealer signed and encrypted split 384 stored in the each of the share-holders 316 using of the dealer signing key of the dealer computing system 308. In some embodiments, each of the share-holders 316 may decrypt the dealer signed and encrypted split 384 using the share-holder encryption key established with the dealer computing system 308. Each of the share-holders 316A may then encrypt the split 384 using a share-holder encryption key established with the combining computing system 320 to generate a dealer signed and encrypted split 384 that can be decrypted by the combining computing system 320.

The combining computing system 320 can be a computing system or can be a part of a computing system that desires to access the secure computing system 304. For example, in embodiments in which the secure computing system 304 is an application server or a database, the combining computing system 320 may run an application or program that needs to access the secure computing system 304. The combining computing system 320 includes a network interface 386, a memory 390, and a combining circuit 374. The memory 390 can include a key management database 396 and a share-holder database 398. The key management database 396 can include the dealer signing key of the dealer computing system 308 and the share-holder encryption keys established with each of the share-holders 316. The share-holder database 398 can include a list of the names and locations (e.g., IP addresses) of the share-holders 316 on the network 324 that include the dealer signed and encrypted shares 384 of the last secret.

The combining circuit 374 is structured to receive at least N dealer signed and encrypted splits from the plurality of share-holders 316. For example, in some embodiments, the combining circuit 374 can be structured to send a request to all of the share-holders 316A-316E to send their dealer signed and encrypted shares 384A-384E to the combining circuit 374. The combining circuit 374 is structured to generate a log of the dealer signed and encrypted shares 384 received by combining computing system 320 and save the log to the memory 390. The log can include an identifier of the each of dealer signed and encrypted shares 384 received and/or an identifier of the share-holders 316 that sent each of the dealer signed and encrypted shares 384, and a timestamp. After receiving N dealer signed and encrypted shares 384, the combining circuit 374 is structured to decrypt each of the N dealer signed and encrypted shares 384 using the share-holder encryption keys of the share-holders 316 that provided the N dealer signed and encrypted shares 384. If more than N dealer signed and encrypted shares 384 are received, the first N shares are used. For example, N shares can include the dealer signed and encrypted first share 384A, the dealer signed and encrypted third share 384C, and the dealer signed and encrypted fifth share 384E and encrypt the dealer signed and encrypted shares 384A, 384C, 384E with the share-holder encryption keys of the first share-holder 316A, the third share-holder 316C, and the fifth share-holder 316E, respectively. In some embodiments, the combining circuit can be structured to destroy all of the received dealer signed and encrypted shares 384 if less than N dealer signed and encrypted shares 384 have been received after a predetermined time period.

The combining circuit 374 is structured to authenticate the N shares 384 by verifying the dealer signature on each of the shares 384 using the dealer signing key of the dealer computing system 308. In other embodiments, the combining circuit 374 is structured to authenticate the N shares 384 by decrypting the encryption or signcryption using the dealer signing key of the dealer computing system 308.

The combining circuit 374 is structured to combine the N shares 384 to regenerate the last secret. For example, the combining circuit 374 can combine the first share 384A, the third share 384C, and the fifth share 384E to regenerate the last secret. For example, the combining circuit 374 can use the first share 384A, the third share 384C, and the fifth share 384E as inputs into a polynomial function that is over a finite field (e.g., a Galois Field). Successful regeneration of the last secret verifies the integrity of each of the first share 384A, the third share 384C, and the fifth share 384E because shares that have been modified and/or replaced by a third party cannot be combined to regenerate the last secret. The combining computing system 320 can then use the last secret to access the first key of the secure computing system 304. The combining computing system 320 can then communicate with the secure computing system 304 using the first key. The combining circuit 374 is structured to destroy the last secret and the received shares 384 and save a log of the destruction to the memory 390.

Figure 4A:
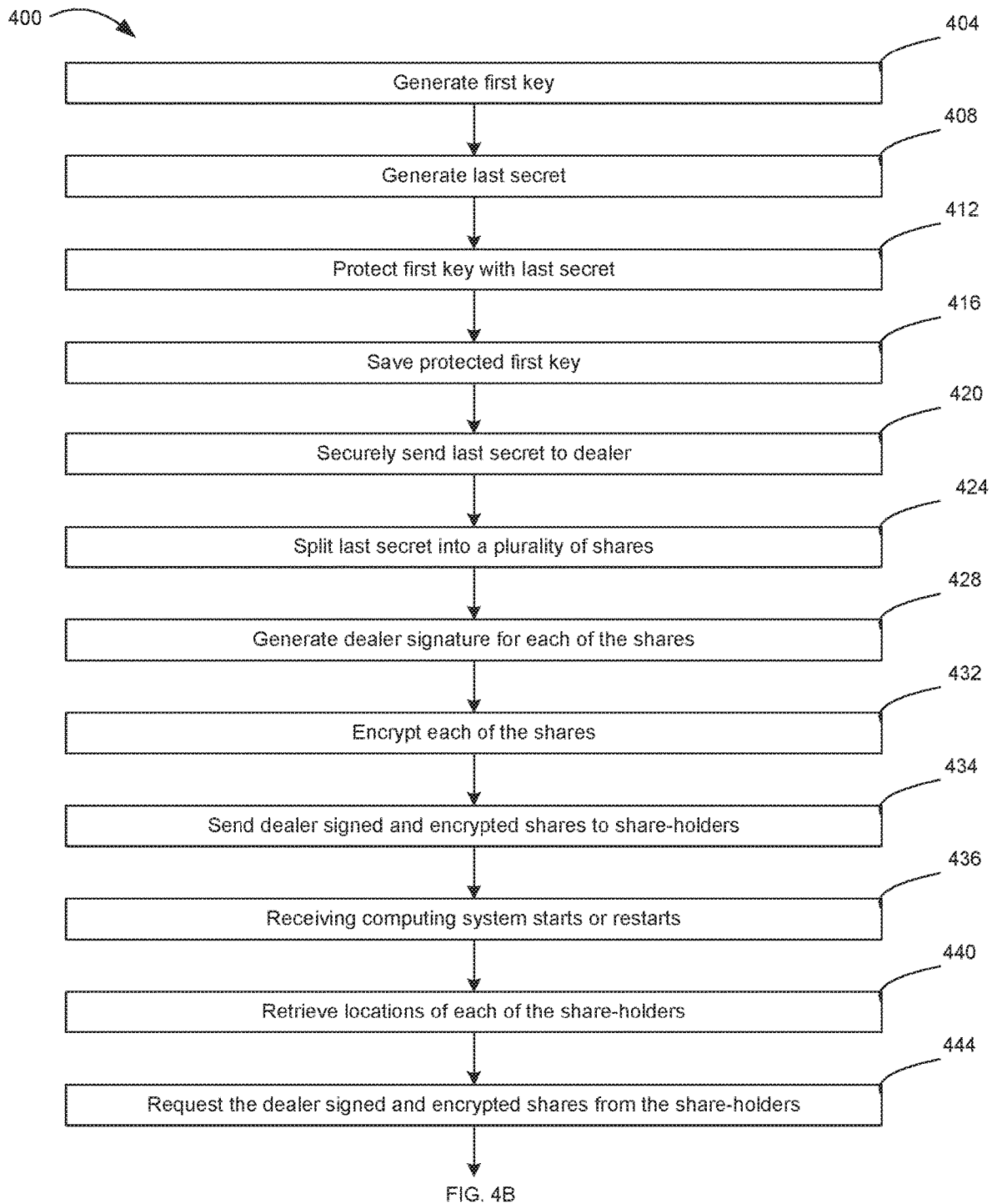
FIGS. 4A and 4B are flow diagrams showing a process of generating and sharing the last secret while maintaining confidentiality, integrity, and authenticity of the last secret, according to one embodiment.
Figure 4B:
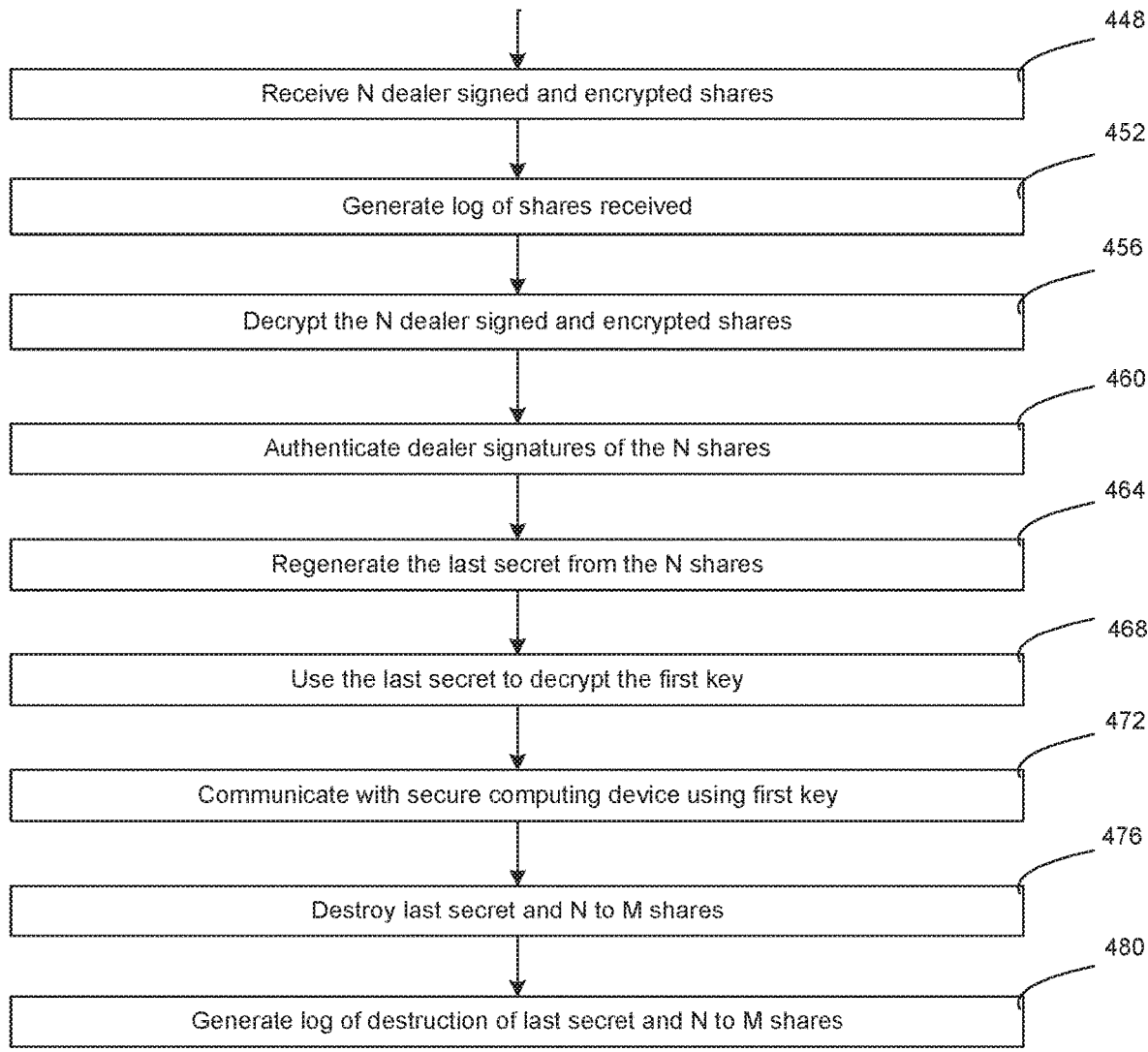

Referring now to FIG. 4, a flow diagram of a method 400 for maintaining the confidentiality, integrity, and authenticity of initialization information to start up a cryptographic process is shown, according to an example embodiment. At step 404, the first key for a secure computing system 304 is generated by the encryption circuit 346. At step 408, the last secret is generated by the encryption circuit 346. At step 412, the first key is protected with the last secret. At step 416, the protected first key is saved to the memory 332 of the secure computing system 304. At step 420, the last secret is sent to the dealer computing system 308. At step 424, the last secret is split into a plurality of shares 384 according to a N of M scheme. For example, in the illustrated embodiment, the last secret is split according to a 3 of 5 scheme, meaning that the last secret is split into five shares, 384A-384E, any three of which can be combined to regenerate the last secret. In other embodiments, the last secret may be split into a different number of N of M shares, a different number of which can be combined to regenerate the last secret. Splitting the last secret into the shares 384 maintains the integrity of the last secret because shares that have been altered or replaced by a malicious party cannot be recombined into the last secret.

At step 428, the splitting circuit 372 signs a portion of each of the shares 384 with a dealer signature using the dealer signing key. In embodiments in which the dealer signature is a digital signature, the dealer signing key is the private key of the dealer computing system 308. In other embodiments, the splitting circuit 372 encrypts or signcrypts the components 184A, 184B using at least the private key of dealer computing system 108. The dealer signatures of the shares 384 can be used by the combining computing system 120 to authenticate the shares.

At step 432, the splitting circuit 372 encrypts each of the shares 384 with the share-holder encryption key of one of the plurality of share-holders 316. Encrypting the shares 384 with the share-holder encryption the share-holders 316 maintains the confidentiality of each of the shares 384, which in turn maintains the confidentiality of the last secret. At step 434, the splitting circuit 372 sends each of the dealer signed and encrypted shares 384 to the respective share-holders 316. In some embodiments, the step 432 can be done before the step 428.

In some embodiments, each of the share-holders 384 may verify the authenticity of the dealer signed and encrypted split 384 using the dealer signing key of the dealer computing system 308. In some embodiments, each of the share-holders 316 may decrypt the dealer signed and encrypted split 384 using a share-holder encryption key established with the dealer computing system 308. Each of the share-holders 316 may then encrypt the split 384 using a share-holder encryption key established with the combining computing system 320 to generate a dealer signed and encrypted split 384 that can be decrypted by the combining computing system 320.

At step 436, the combining computing system 320 starts up and desires to establish a connection with the secure computing system 304. At step 440, the combining computing system 320 retrieves the locations of each of the plurality of share-holders 316 from the memory 390. At step 444, the combining computing system 320 sends requests to each of the plurality of share-holders 316 asking the plurality of share-holders 316 to send their dealer signed and encrypted shares 384 to the combining computing system 320. At step 448, the combining computing system 320 receives N to M dealer signed and encrypted shares. In some embodiments, the combining computing system 320 may receive N shares or more than N dealer signed and encrypted shares (e.g., up to M shares). In embodiments in which the combining computing system 320 receives more than N dealer signed and encrypted shares 384, the combining computing system 320 uses the first N dealer signed and encrypted shares 384 received. For example, in the illustrated embodiment, the combining computing system 320 can receive the dealer signed and encrypted first share 384A, the dealer signed and encrypted third share 384C, and the dealer signed and encrypted fifth share 384E. At step 452, the combining computing system 320 generates a log of the N to M dealer signed and encrypted shares 384 received and saves the log to the memory 390. The log can include an identifier of the each of dealer signed and encrypted shares 384 received and/or an identifier of the share-holders 316 that sent each of the dealer signed and encrypted shares 384, and a timestamp. In some instances, the at step 448, the combining computing system 320 may receive less than N splits at step 448. In such instances, the combining computing system 320 generates the log of the dealer signed and encrypted shares 384 at step 452. The method 400 does not progress to step 456. In some embodiments, after N dealer signed and encrypted shares 384 have not been received in a predetermined time period, the combing computing system 320 can destroy all of the dealer signed and encrypted shares 384 and log the destruction of the received dealer signed and encrypted shares 384.

At step 456, the combining computing system 320 decrypts the first N dealer signed and encrypted shares using the respective share-holder encryption keys of the N share-holders 316 that provided the N dealer signed and encrypted shares. At step 460, the combining computing system 320 authenticates the dealer signatures of the N dealer signed shares using the dealer signing key of the dealer computing system 308. For example, the combining computing system 320 may use the dealer signing key of the dealer computing system 308 to verify the portions of the first share 384A, the third share 384C, and the fifth share 384E that have been dealer signed by the dealer computing system 308. In some embodiments, the combining computing system 320 may perform the step 460 before the step 456. At step 464, the combining computing system 320 regenerates the last secret from the N shares. For example, the combining computing system 320 may provide the N shares as the inputs of a polynomial function that can regenerate the last secret. Successful regeneration of the last secret verifies the integrity of the N shares 384. At step 468, the combining computing system 320 uses the last secret to decrypt the first key of the secure computing system 304. At step 472, the combining computing system 320 communicates with the secure computing system 304 using the first key. At step 476, the last secret and the N to M the shares 384 received by the combining computing system 320 are is erased, and is never written to disk memory, cache memory, or any other non-volatile media. At step 480, the combining computing system 320 logs the destruction of the last secret and each of the N to M shares 384 received by the combining computing system in the memory 390.

An advantage of the above-described methods is that each of the dealer signed and encrypted splits 184, 384 can be individually encrypted with a key specific to the combining computing system 120, 320 and dealer signed using key(s) established between the dealer computing system 108, 308 that generated the splits 184, 384 and the combining computing system 320. The key(s) established between the dealer computing system 108, 308 and the combining computing system 120, 320 can be CEKs established using either CMS-based key transport or key agreement schemes. In some embodiments, the key(s) can include symmetric key pairs. In some embodiments, the key(s) can include asymmetric key pairs. Accordingly, the dealer signed and encrypted splits 184, 384 can be stored in a share-holder location that is public. For example, the dealer signed and encrypted splits 184, 384 can be stored central location such as a last secret blockchain because only the combining computing system 120, 320 can decrypt each of the dealer signed and encrypted splits 184, 384, verify the dealer signature, and regenerate the last secret based on the splits 184, 384. The location of the dealer signed and encrypted splits 184, 384 can be identified by an identifier, such as a block ID (e.g., a hash of a previous block header), block number, time stamp, uniform resource locator ("URL"), or another type of identifier. An additional advantage of the last secret blockchain is that blockchains are very difficult to modify, so it is possible to keep an accurate history of the last secrets, for example for a key management system. For example, successive blocks in the last secret blockchain can indicate the previous dealer signed and encrypted splits 184, 384 and the time periods that these previous dealer signed and encrypted splits 184, 384 were valid.

Figure 5:
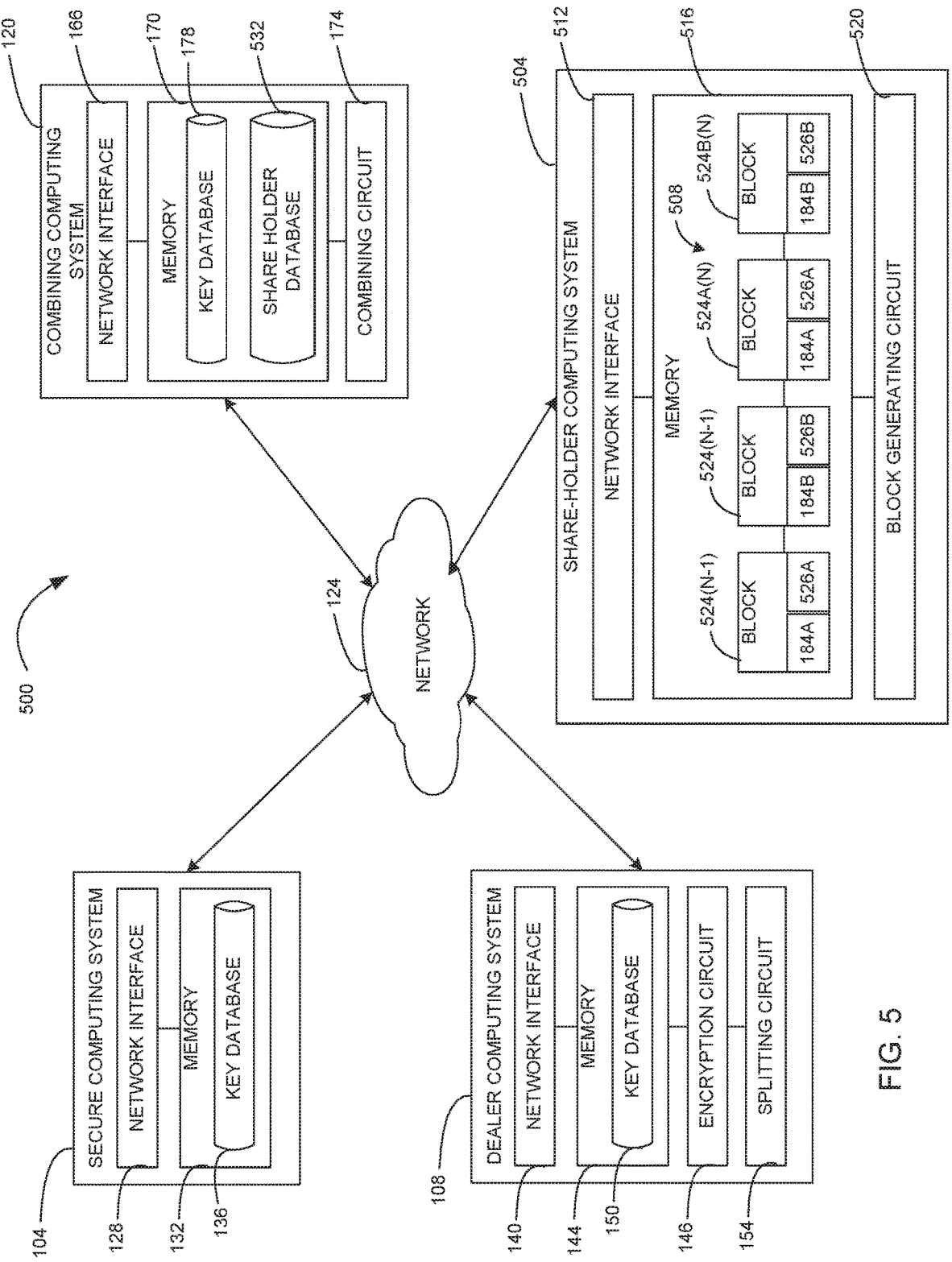
FIG. 5 is an environmental view of a system for generating a last secret, storing the last secret in a blockchain, and maintaining confidentiality, integrity, and authenticity of the last secret, according to one embodiment.

FIG. 5 illustrates an environmental view of a system 500 for generating a last secret that can be stored in a blockchain, according to an example embodiment. The system 500 is substantially similar to the system 100, so like parts will be indicated using the same numbers as used in the system 100. As shown in FIG. 5, the system 500 includes the secure computing system 104, a dealer computing system 108, one or more share-holders 504, and a combining computing system 120 connected by a network 124. In the illustrated embodiment, the one or more share-holders 504 is one or more last secret blockchains 508. For the sake of brevity, only features of the secure computing system 104, the dealer computing system 108, and the combining computing system 120 that are different than what is described with the system 100 are described in detail below.

The share-holder 504 is a share-holder computing system. The share-holder computing system 504 includes a network interface 512, a memory 516, and a block-generating circuit 520. The network interface 512 is structured to establish a communication session via the network 124 with the other components of the system 500. As shown in FIG. 5, the memory 516 includes the last secret blockchain 508. The last secret blockchain 508 includes a plurality of blocks 524, one or more of which can include a dealer signed and encrypted split 184 and a block ID 526, which includes a hash of the block header of the previous block. The plurality of blocks 524 can also include information indicative of an identity of the dealer computing 108 system and/or information indicative of an identity of the combining computing system 120. In the illustrated embodiment, each of the encrypted splits 184 is a component generated using an N of N scheme as described above with respect to the system 100. In the illustrated embodiment, the last secret blockchain 508 includes a first block 524A including the dealer signed and encrypted first component 184A and a second block 524B including the dealer signed and encrypted second component 184B. The hashes indicate previous blocks. A relying party may use the hash to verify the integrity of the data written to the last secret blockchain 508 and to locate a particular block of the last secret blockchain 508.

The memory 170 of the combining computing system 120 can include a share-holder database 532, which can include a location of the last secret blockchain 508 and the blocks 524A, 524B that include the dealer signed and encrypted components 184A, 184B. The combining circuit 174 is structured to retrieve the dealer signed and encrypted components 184A, 184B from the blocks 524A, 524B of the last secret blockchain 508, respectively, decrypt the dealer signed and encrypted components 184A, 184B using the key(s) established between the dealer computing system 108 and the combining computer system 120 of the dealer computing system 108, verify the dealer signatures of the components 184A, 184B using the dealer signing key of the dealer computing system 108, and combine the components 184A, 184B to regenerate the last secret as described above with respect to the system 100.

Figure 6A:
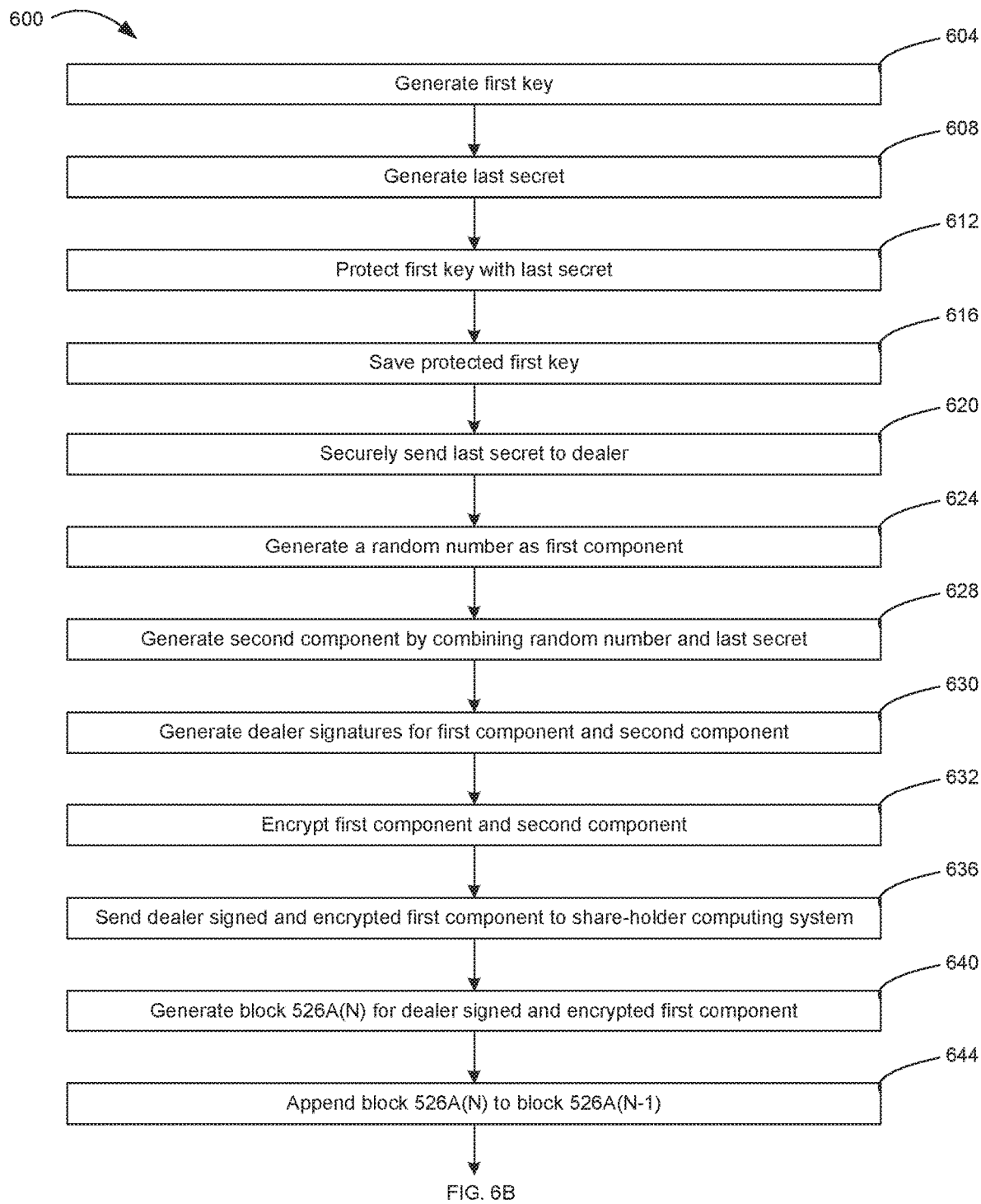
FIGS. 6A and 6B are flow diagrams showing a process of generating the last secret, storing the last secret in a blockchain, and sharing the last secret while maintaining confidentiality, integrity, and authenticity of the last secret, according to one embodiment.
Figure 6B:
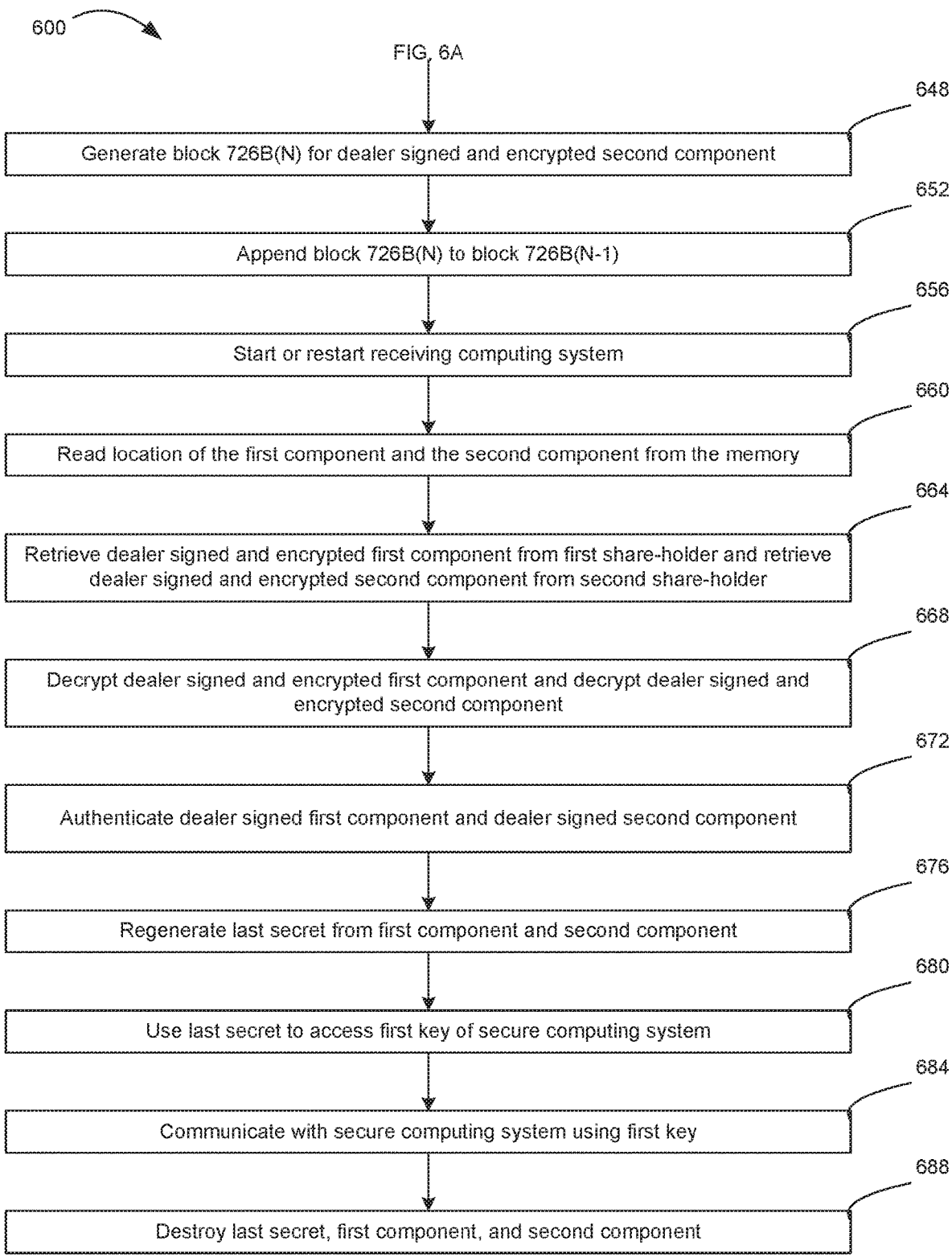

Referring now to FIG. 6, a flow diagram of a method 600 for maintaining the confidentially, authenticity, and integrity of a last secret is shown, according to an example embodiment. Steps 604-628 of the method 600 are substantially the same as steps 204-228 of the method 200. Steps 604-628 and are shown in FIG. 6 but will not be described in detail herein.

At step 632, the splitting circuit 154 encrypts the first component 184A and the second component 184B with the encryption key(s) established with the combining computing system 120. At step 636, the splitting circuit 154 sends the dealer signed and encrypted first component 184A and the dealer signed and encrypted second component to the share-holder computing system 504. At step 640, the share-holder computing system 504 generates the block 524A$_N$ for the dealer signed and encrypted first component 184A. The block 524A$_N$ includes the dealer signed and encrypted first component 184A, the hash, and a time stamp. The hash indicates a previous block 524A$_{N-1}$ corresponding to a previous iteration of the dealer signed and encrypted first component. At step 644, the share-holder computing system 504 appends the block 524A$_N$ to the block 524A$_{N-1}$. At step 648, the share-holder computing system 504 generates a block 524B$_N$ for the second component 184B. The block 524B$_N$ includes the dealer signed and encrypted second component 184B, the hash, and the time stamp. The hash indicates a previous block 524B$_{N-1}$ corresponding to a previous iteration of the dealer signed and encrypted second component 184B. At step 652, the share-holder computing system 504 appends the block 524B$_N$ to the block 524$_{N-1}$.

At step 656, the combining computing system 120 starts or restarts and desires to establish a connection with the secure computing system 104. At step 660, the combining computing system 120 reads the location of the last secret blockchain 508, the block 524A$_N$ that includes the dealer signed and encrypted first component 184A, and the block 524B$_N$ that includes the dealer signed and encrypted second component 184B from the last secret blockchain 508. At step 664, the combining circuit 174 retrieves the dealer signed and encrypted first component 184A from the block 524A$_N$ and the dealer signed and encrypted second component 184B from the block 524A$_N$. At step 668, the combining circuit 174 decrypts the dealer signed and encrypted first component 184A and the dealer signed and encrypted second component 184B using the key established between the dealer combining system 108 and the combining computing system 120. At step 672, the combining circuit 174 authenticates the dealer signature of the first component 184A and the dealer signature of the second component 184B using the dealer signing key of the dealer computing system 108 to verify the authenticity of the components 184A, 184B. In some embodiments, the combining circuit 174 may perform the step 672 before the step 668. At step 676, after authenticating the first component 184A and the second component 184B, the combining circuit 174 regenerates the last secret from the first component 184A and the second component 184B using XOR. Successful regeneration of the last secret verifies the integrity of the first component 184A and the second component 184B. At step 680, the combining circuit 174 uses the last secret to decrypt the first key of the secure computing system 104. At step 684, the combining computing system 120 communicates with the secure computing system 104 using the first key. As step 688, the last secret, the first component, and the second component are erased, and are never written to disk memory, cache memory, or any other non-volatile media.

Figure 7:
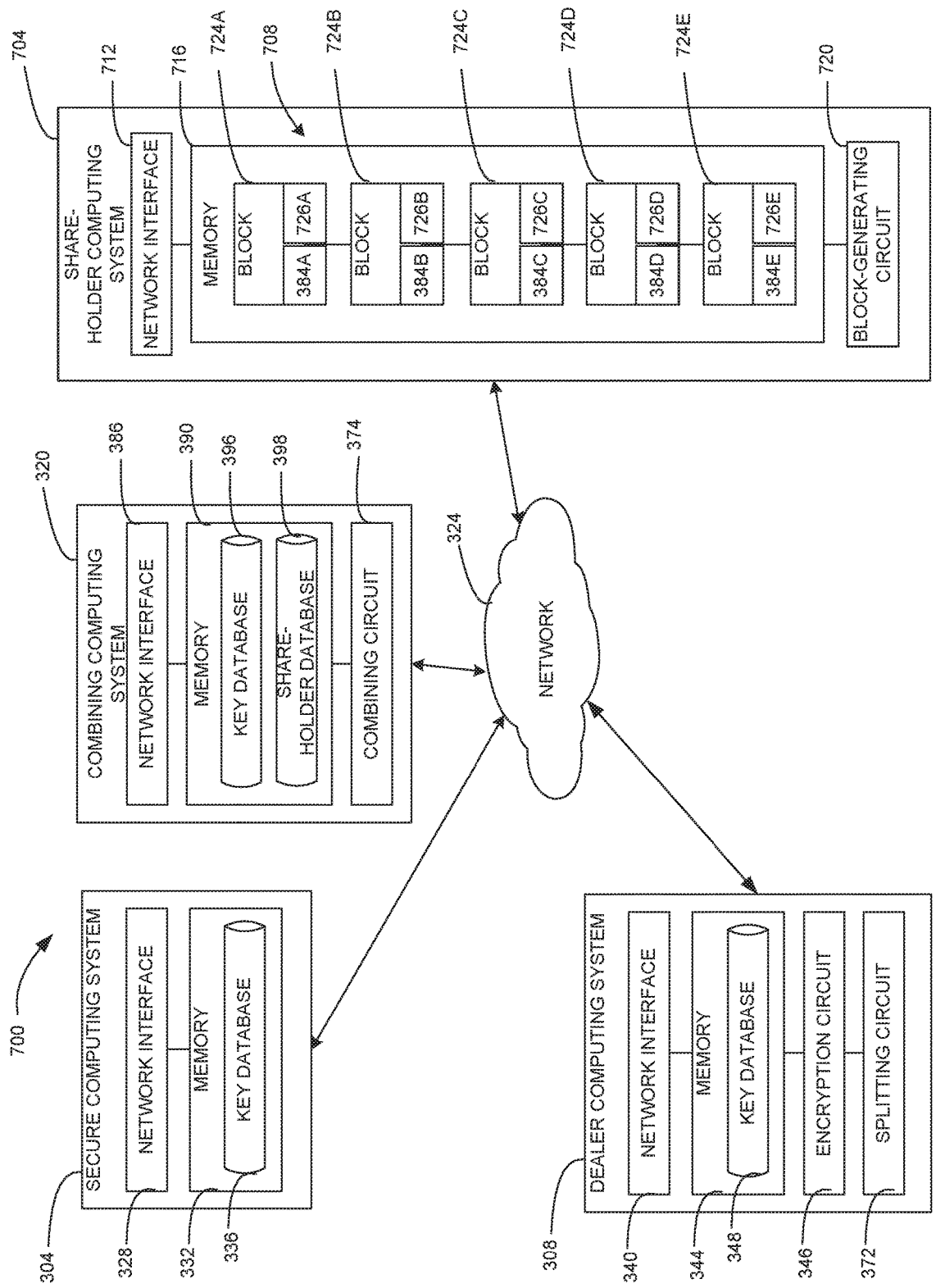
FIG. 7 is an environmental view of a system for generating a last secret, storing the last secret in a blockchain, and maintaining confidentiality, integrity, and authenticity of the last secret, according to one embodiment.

FIG. 7 illustrates an environmental view of a system 700 for generating a last secret that can be stored in a blockchain, according to an example embodiment. The system 700 is substantially similar to the system 300, so like parts will be indicated using the same numbers as used in the system 300.

As shown in FIG. 7, the system 700 includes the secure computing system 304, the dealer computing system 308, one or more share-holders 704, and the combining computing system 320 connected by the network 324. In the illustrated embodiment, the one or more share-holders 704 is one or more last secret blockchains 708. For the sake of brevity, only features of the secure computing system 304, the dealer computing system 308, and the combining computing system 320 that are different than what is described with the system 300 are described in detail below.

The share-holder 704 is a share-holder computing system. The share-holder computing system 704 includes a network interface 712, a memory 716, and a block-generating circuit 720. The network interface 712 is structured to establish a communication session via the network 324 with the other components of the system 700. As shown in FIG. 7, the memory 716 includes the last secret blockchain 708. The last secret blockchain 708 includes a plurality of blocks 724 that each include a dealer signed and encrypted split 384 and a block ID 726, which includes a hash of the block header of the previous block. In the illustrated embodiment, each of the encrypted splits 384 is a share generated using an N of M scheme as described above with respect to the system 300. The hash indicates the previous block $724_{N-1}$. A relying party such as the combining computing system 320 may use the hashes to view a history of modifications to and/or replacement of the encrypted shares 384.

The block-generating circuit 720 is structured to receive the dealer signed and encrypted shares 384 from the dealer computing system 308. The block-generating circuit 720 is structured to generate a block $724_N$ for each of the dealer signed and encrypted shares 384. Each block $724_N$ includes one of the dealer signed and encrypted shares 384, the hash indicating a block $724_{N-1}$ corresponding to the previous dealer signed and encrypted share 384, and a time stamp. The plurality of blocks 724 can also include information indicative of an identity of the dealer computing system 308 and/or information indicative of an identity of the combining computing system 320 in their headers. FIG. 7 illustrates an embodiment in which the last secret has been split into 5 shares 384A-384E as described above with respect to the system 300. As illustrated in FIG. 7, a first block $724A_N$ corresponds to the dealer signed and encrypted first share 384A, a second block $724B_N$ corresponds to the dealer signed and encrypted second share 384B, a third block $724C_N$ corresponds to the dealer signed and encrypted third share 384C, a fourth block $724D_N$ corresponds to the dealer signed and encrypted fourth share 384D, and a fifth block $724E_N$ that corresponds to the dealer signed and encrypted fifth share 384E. As illustrated in FIG. 7, the last secret blockchain 708 can also include a plurality of blocks $724A_{N-1}$-$724E_{N-1}$ corresponding to previous shares 384A-384E, respectively. The hash of each of the blocks $724A_N$-$724E_N$ includes a reference to the blocks $724A_{N-1}$-$724E_{N-1}$, respectively.

The memory 390 of the combining computing system 320 includes a share-holder database 398, which can include a location of the last secret blockchain 708 and the blocks 524 that include the dealer signed and encrypted shares 384, respectively. The combining computing system 120 is structured to retrieve the location of the last secret blockchain 708 from the memory 390. The combining computing system 320 is structured to request the dealer signed and encrypted shares 384 from the last secret blockchain 708. In response to receiving N of the M shares, 384 the combining circuit 374 is structured to decrypt the N shares 384 using the private key of the combining computing system 320. The combining circuit 374 then authenticates the dealer signature and regenerates the last secret as described above with respect to the system 300.

Figure 8A:
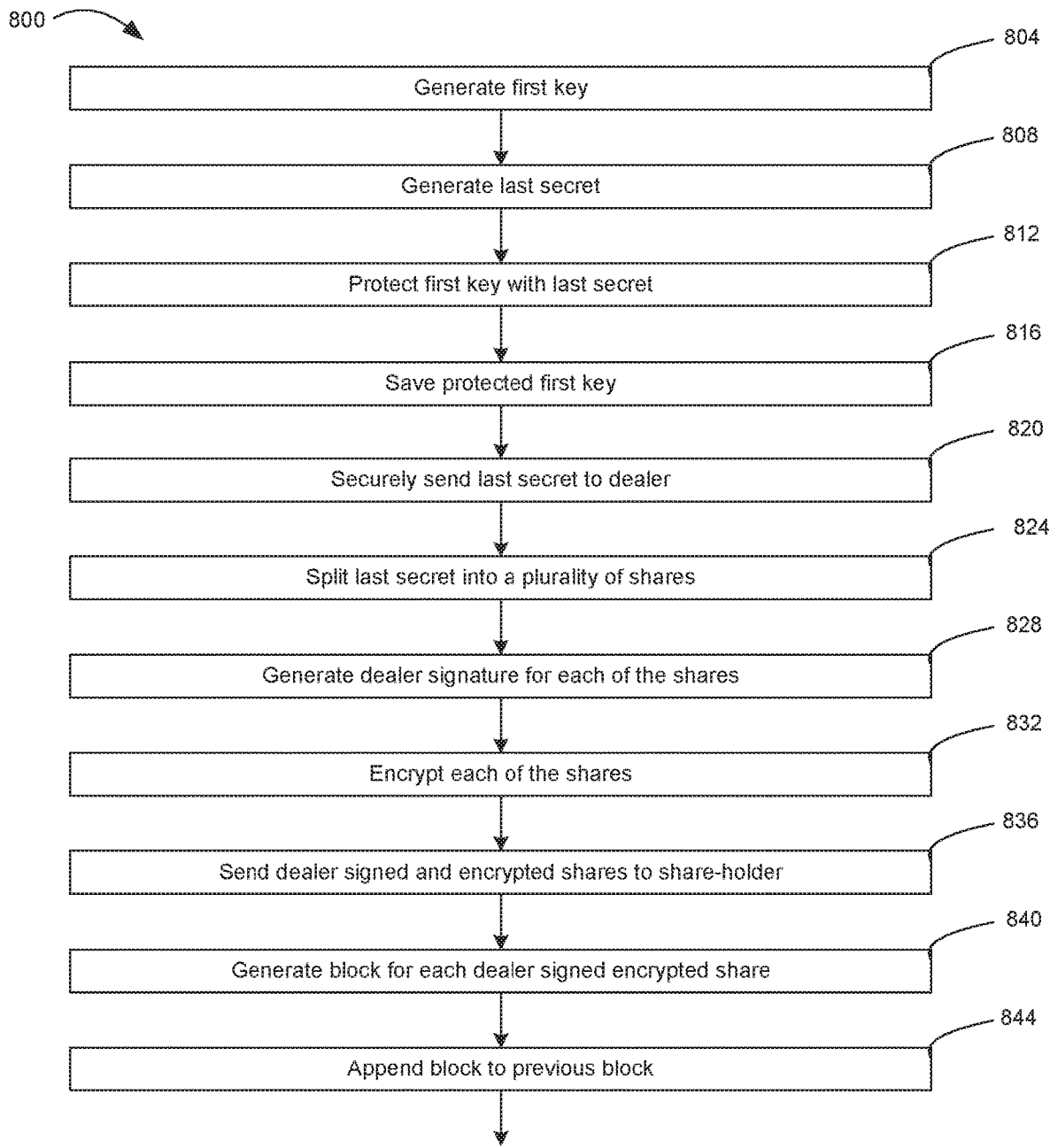
FIGS. 8A and 8B are flow diagrams showing a process of generating the last secret, storing the last secret in a blockchain, and sharing the last secret while maintaining confidentiality, integrity, and authenticity of the last secret, according to one embodiment.
Figure 8B:
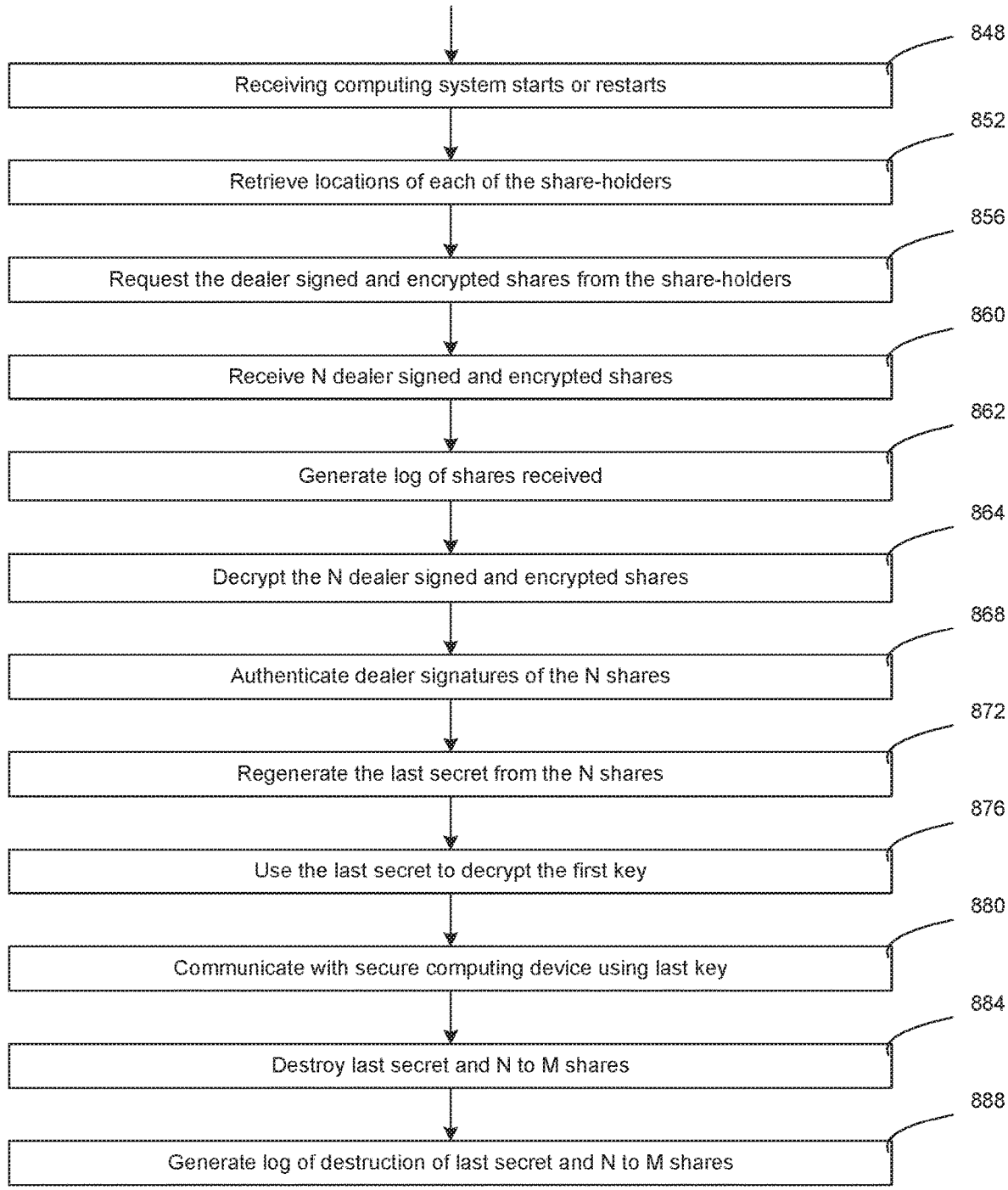

Referring now to FIG. 8, a flow diagram of a method 800 for maintaining the confidentiality, integrity, and authenticity of initialization information to start up a cryptographic process is shown, according to an example embodiment. Steps 804-828 of the method 800 are substantially the same as steps 404-428 of the method 400. Steps 804-828 and are shown in FIG. 8 but will not be described in detail herein.

At step 832, each of the shares 384 is encrypted with an encryption key that has been established with the combining computing system 320. At step 836, the dealer computing system 308 sends the shares 384 to the share-holder computing system 704. At step 840, the share-holder computing system 704 generates a block 724 for each the dealer signed and encrypted shares 384. For example, each of the blocks $724A_N$-$724E_N$ includes the dealer signed and encrypted shares 384A-384E, respectively, the hashes, respectively, and a time stamp. The hashes indicate a previous block $724A_{N-1}$-$724E_{N-1}$, respectively, which corresponds to a previous iteration of the shares 384A-384E, respectively. At step 844, the block-generating circuit 720 appends the block $724_N$ to the block $724_{N-1}$. For example, the block-generating circuit 720 can append the blocks $724A_N$-$724E_N$ to the blocks $724A_{N-1}$-$724E_{N-1}$, respectively.

At step 848, the combining computing system 320 starts up and desires to establish a connection with the secure computing system 304. At step 852, the combining computing system 320 retrieves the location of the last secret blockchain 708 and the locations (e.g., the blocks $724_N$) of the dealer signed and encrypted shares 384 from the memory 390. At step 856, the combining computing system 320 requests that the share-holder computing system 704 send the dealer signed and encrypted shares 384 from the last secret blockchain 708. At step 860, the combining computing system 320 determines that N dealer signed and encrypted shares have been received. At step 862, the combining computing system 320 generates a log of the N to M dealer signed and encrypted shares 384 received and saves the log to the memory 390. The log can include an identifier of the each of dealer signed and encrypted shares 384 received and/or an identifier of the share-holders 316 that sent each of the dealer signed and encrypted shares 384, and a timestamp. In some instances, the combining computing system 320 may receive less than N splits at step 448. In such instances, the combining computing system 320 generates the log of the dealer signed and encrypted shares 384 at step 862. The method 800 does not progress to step 864. In some embodiments, after N dealer signed and encrypted shares 384 have not been received in a predetermined time period, the combing computing system 320 can destroy all of the dealer signed and encrypted shares 384 and log the destruction of the received dealer signed and encrypted shares 384. If more than N shares 384 are received, the combining computing system 320 uses the first N shares 384.

At step 864, the combining computing system 320 decrypts the N dealer signed and encrypted shares using the private key of the combining computing system 320. At step 868, the combining computing system 320 authenticates the dealer signatures of the N shares using the dealer signing key of the dealer computing system 308. In some embodiments, the combining computing system 320 may perform the step 868 before the step 864. At step 872, the combining computing system 320 regenerates the last secret from the N shares. For example, the combining computing system 320 may provide the N shares as the inputs of a polynomial function that can regenerate the last secret. Successful regeneration of the last secret verifies the integrity of the N shares 384 because shares 384 that have been modified and/or replaced by a third party cannot be recombined into the last secret. At step 876, the combining computing system 320 uses the last secret to decrypt the first key of the secure computing system 304. At step 880, the combining computing system 320 communicates the secure computing system 304 using the first key. At step 884, the last secret, and the N to M shares received are erased, and is never written to disk memory, cache memory, or any other non-volatile media. At step 888, the combining computing system 320 logs the destruction of the last secret and each of the N to M shares 384 received by the combining computing system 320 in the memory 390.

In some embodiments, any of the secure computing systems 104, 304 can grant access to a digital currency. In such an embodiment, the combining computing system 120, 320 can be require access to a predetermined number of the dealer signed and encrypted splits 184, 384, in order to unlock the last secret for communicating with the secure computing system 104, 304. In such an embodiment, the dealer computing system 108, 308 may encrypt the dealer signed splits 184, 384 with the encryption key established with the combining computing system 120, 320. The entity giving the digital currency may retain the location (e.g., the location of the last secret blockchain 508, 708 and/or the specific blocks 524, 724 of the last secret blockchain 508, 708 that include the at least one dealer signed and encrypted splits 184, 384) until the entity receiving the digital currency has completed the terms of the contract.

In some embodiments, any of the secure computing systems 104, 304 can grant access to a biometric stored on the secure computing system 104, 304. For example, the secure computing system 104, 304 can be personal computing system such as a mobile phone, a laptop or desktop computing system, a tablet computing system, an internet-of-things (IoT) device, etc. The personal computing system can also be the combining computing system 120, 320. The dealer computing systems 108, 308 can divide the last secret into the split(s) 184, 384 as described above with respect to the methods 200, 400 by the dealer computing system 108, 308. The dealer computing system 108, 308 can be a remote computing system separate from the secure computing system 104, 304. The dealer computing system 108, 308 has signed the split(s) 184, 384 with the private key of the dealer computing system 108, 308 encrypted the split(s) 184, 384 with the encryption key established with the combining computing system 120, 320 and sent the dealer signed and encrypted spilt(s) 184, 384 to the share-holder computing system 504, 704. The share-holder computing system 504, 704 can save the dealer signed and encrypted splits(s) 184, 384 to the last secret blockchain 508, 708 as described above with respect to the methods 600, 800.

Upon starting up, the personal computing system (e.g., as the combining computing system 120, 320) can connect to the share-holder computing system 504, 704 over the network 124, 324. The personal computing system (e.g., as the combining computing system 120, 320) can provide identity information, such as an International Mobile Equipment Identity (IMEI), to the share-holder computing system 504, 704. The share-holder computing system 504, 704 can retrieve the dealer signed and encrypted splits 184, 384 in response to receiving the identity information from the personal computing system. The share-holder computing system 504, 704 can then send the dealer signed and encrypted splits 184, 384 to the personal computing system (e.g., as the combining computing system 120, 320). The personal computing system (e.g., as the combining computing system 120, 320), can decrypt the dealer signed and encrypted split(s) 184, 384 using the key(s) that have been established between the dealer computing system 108, 308 and the combining computing system 120, 320 portion of the personal computing system, authenticate the dealer signature of each of the dealer signed splits 184, 384 using the dealer signing key of the dealer computing system 108, 308, and regenerate the last secret as described above with respect to the methods 200, 400. The personal computing system (e.g., as the combining computing system 120, 320) can then use the last secret to decrypt the biometric stored on the personal computing system (e.g., as the secure computing system 104, 304).

In some embodiments, the share-holders 116, 316 and/or the share-holding computing systems 504, 704 are included on multiple computing systems that communicate over the network 124, 324. In some embodiments, computing systems include and/or can be a master share-holder, such that the splits 184, 384 cannot be recombined when the master share-holder is not connected to the network 124, 324. Each of the combining computing systems 120, 320 can recombine split(s) 184, 384 to generate last secret that allows the computing systems to communicate when the share-holder is proximate the other share-holders 116, 316 and/or the other share-holder computing systems 504, 704. In other embodiments, the computing systems that communicate over the network 124, 324 may be breakable. In such an embodiment, the computing systems can only communicate when enough computing systems are present to allow for recovery of the last secret.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Ripple, Litecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web embodiments of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for securely sharing and authenticating a last secret, the method comprising:
generating, by a dealer computing system, a first key and a last secret, the first key providing access to a secure computing system, the last secret being the last cryptographic element controlling access to the first key;
splitting, by the dealer computing system, the last secret into a first split and a second split;
signing the first split and the second split using a dealer signing key of the dealer computing system so as to attach a dealer signature to each of the first split and the second split;
encrypting, by the dealer computing system, the first split using a first key of a first share-holder and encrypting, by the dealer computing system, the second split using a first key of a second share-holder, the first shareholder structured to store the dealer signed and encrypted first split and the second share-holder structured to store the dealer signed and encrypted second split;

decrypting, by the first share-holder, the first split using the first key of the first share-holder and encrypting, by the first share-holder, the first split using a second key of the first share-holder that has been established by a combining computing system, the second key of the first share-holder corresponding to a first asymmetric key being restricted to use by the first share-holder;

decrypting, by the second share-holder, the second split using the first key of the second share-holder and encrypting, by the second share-holder, the second split using a second key of the second share-holder that has been established by the combining computing system, the second key of the second share-holder corresponding to a second asymmetric key being restricted to use by the second share-holder, wherein the encrypting maintains confidentiality of the last secret, the last secret is not written to any non-volatile media, and the dealer signature can be verified to determine integrity and authenticity of the last secret; and wherein the dealer signed and encrypted first split and the dealer signed and second split are stored in a blockchain.

2. The method of claim 1, wherein the last secret is a password, a second key, or a tokenized value.

3. The method of claim 1, wherein the last secret is split into the first split and the second split using a N of N component scheme.

4. The method of claim 1, wherein the last secret is split into the first split and the second split using a N of M share scheme.

5. A system for securely sharing and authenticating a last secret, the system comprising:

a dealer computing system including a dealer signing key, an encryption key established with a first share-holder, and an encryption key established with a second share-holder, the dealer computing system comprising:

an encryption circuit structured to generate a first key and a last secret, the first key providing access to a secure computing system, the last secret not being written to any non-volatile media, and being the last cryptographic element controlling access to the first key; and a splitting circuit structured to:

split the last secret into a first split and a second split so as to maintain integrity of the last secret;

sign each of the first split and the second split with the dealer signing key so as to generate a dealer signature for the first split and the second split, the respective dealer signatures verifiable so as to maintain integrity and authenticity of the last secret;

generate a dealer signed and encrypted first split and a dealer signed and encrypted second split by encrypting the dealer signed first split with the encryption key established with the first share-holder structured to store the dealer signed and encrypted first split and by encrypting the dealer signed second split with the encryption key established with the second share-holder structured to store the dealer signed and encrypted second split so as to maintain confidentiality of the last secret;

the first share-holder including a first key established by the dealer computing system and a second key of the first share-holder and established by a combining computing system, the first share-holder comprising an encryption circuit structured to decrypt the first split using the first key and encrypt the first split using the second key of the first share-holder, the second key of the first share-holder corresponding to a first asymmetric key being restricted to use by the first share-holder;

the second share-holder including a first key established by the dealer computing system and a second key of the second share-holder and established by the combining computing system, the second share-holder comprising an encryption circuit structured to decrypt the second split using the first key and encrypt the second split using the second key of the second share-holder, the second key of the second share-holder corresponding to a second asymmetric key being restricted to use by the second share-holder; and wherein the dealer signed and encrypted first split and the dealer signed and second split are stored in a blockchain.

6. The system of claim 5, wherein the last secret is a password or a second key, or a tokenized value.

7. The system of claim 5, wherein the last secret is split into the first split and the second split using a N of N component scheme.

8. The system of claim 5, wherein the last secret is split into the first split and the second split using a N of M share scheme.

9. A non-transitory computer-readable medium having processor-readable instructions stored thereon such that, when executed by a processor, cause the processor to:

generate, by a dealer computing system, a first key and a last secret, the first key providing access to a secure computing system, the last secret being the last cryptographic element controlling access to the first key;

split, by the dealer computing system, the last secret into a first split and a second split;

sign the first split and the second split using a dealer signing key of the dealer computing system so as to attach a dealer signature to each of the first split and the second split;

encrypt, by the dealer computing system, the first split using a first key of a first share-holder and encrypt, by the dealer computing system, the second split using a first key of a second share-holder, the first share-holder structured to store the dealer signed and encrypted first split and the second share-holder structured to store the dealer signed and encrypted second split;

decrypt, by the first share-holder, the first split using the first key of the first share-holder and encrypt, by the first share-holder, the first split using a second key of the first share-holder that has been established by a combining computing system, the second key of the first share-holder corresponding to a first asymmetric key being restricted to use by the first share-holder; and decrypt, by the second share-holder, the second split using the first key of the second share-holder and encrypt, by the second share-holder, the second split using a second key of the second share-holder that has been established by the combining computing system, the second key of the second share-holder corresponding to a second asymmetric key being restricted to use by the second share-holder, wherein the encrypting maintains confidentiality of the last secret, the last secret is not written to any non-volatile media, and the dealer signature can be verified to determine integrity and authenticity of the last secret; and wherein the dealer signed and encrypted first split and the dealer signed and second split are stored in a blockchain.

10. The method of claim 1, wherein the last secret is a password, a second key, or a tokenized value.

11. The method of claim 1, wherein the last secret is split into the first split and the second split using a N of N component scheme.

12. The method of claim 1, wherein the last secret is split into the first split and the second split using a N of M share scheme.

* * * * *